United States Patent
Iuchi et al.

(10) Patent No.: US 9,494,928 B2
(45) Date of Patent: Nov. 15, 2016

(54) NUMERICAL CONTROL APPARATUS

(75) Inventors: Yukihiro Iuchi, Tokyo (JP); Daisuke Fujino, Tokyo (JP); Shunro Ono, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 238 days.

(21) Appl. No.: 14/362,546

(22) PCT Filed: Feb. 6, 2012

(86) PCT No.: PCT/JP2012/052609
§ 371 (c)(1),
(2), (4) Date: Jun. 3, 2014

(87) PCT Pub. No.: WO2013/118241
PCT Pub. Date: Aug. 15, 2013

(65) Prior Publication Data
US 2015/0134105 A1    May 14, 2015

(51) Int. Cl.
G05B 19/19 (2006.01)
G05B 19/4155 (2006.01)

(52) U.S. Cl.
CPC .......... *G05B 19/19* (2013.01); *G05B 19/4155* (2013.01); *G05B 2219/32105* (2013.01); *G05B 2219/36361* (2013.01)

(58) Field of Classification Search
CPC .................................................. G05B 19/19
(Continued)

(56) References Cited

U.S. PATENT DOCUMENTS 8,600,542 B2 *  12/2013  Fujishima .......... G05B 19/4067
                                                 700/177
2008/0054829 A1 *  3/2008  Onishi ................... G05B 19/19
                                                 318/255

FOREIGN PATENT DOCUMENTS

JP    63-311408 A    12/1988
JP    02-309403 A    12/1990
(Continued)

OTHER PUBLICATIONS

International Search Report of PCT/JP2012/052609 dated May 1, 2012.
(Continued)

*Primary Examiner* — Tejal Gami
(74) *Attorney, Agent, or Firm* — Sughrue Mion, PLLC

(57) ABSTRACT

A numerical control apparatus includes a program analyzing unit configured to pre-fetch a tool replacement command and a post-replacement positioning command from a machining program and output these commands, a tool-replacement-command output unit configured to cause, based on the tool replacement command, a machine tool to execute a tool replacing operation, and a movement-command determining unit and an interpolating unit configured to start, when the post-replacement positioning command is an axis component command for positioning an axis related to the tool replacing operation, control of the axis based on the axis component command, after waiting for completion of the tool replacing operation, and start, when the post-replacement positioning command is an axis component command for positioning an axis unrelated to the tool replacing operation, control of the axis based on the axis component command, without waiting for the same.

7 Claims, 14 Drawing Sheets

(58) Field of Classification Search
USPC .................................. 700/186, 177; 318/255
See application file for complete search history.

(56) References Cited

FOREIGN PATENT DOCUMENTS

| | | |
|---|---|---|
| JP | 05-313718 A | 11/1993 |
| JP | 06-000738 A | 1/1994 |
| JP | 11-048072 A | 2/1999 |
| JP | 11-300577 A | 11/1999 |
| JP | 2005-040929 A | 2/2005 |

OTHER PUBLICATIONS

Communication dated Dec. 9, 2014, issued by the Taiwanese Patent Office in counterpart Taiwanese application No. 101125669 Partial Translation.

* cited by examiner

FIG.6

```
     .
     .
     .
N11  T1 M6           (TOOL REPLACEMENT COMMAND)
N12  G0 Z10.         (POSITIONING COMMAND FOR AXIS RELATED TO
                      TOOL REPLACEMENT)
N13  G0 X50. Y50.    (POSITIONING COMMAND FOR AXIS UNRELATED
                      TO TOOL REPLACEMENT)
N14  G1 X10. F1000.  (CUTTING COMMAND)
     .
     .
     .
```

FIG.11

```
       .
       .
       .
N21 | G30 Z0.          (TOOL REPLACEMENT POSITION RETURN COMMAND)
N22 | T1 M6            (TOOL REPLACEMENT COMMAND)
N23 | G0 X50. Z10.     (POSITIONING COMMAND FOR AXIS RELATED TO TOOL
                        REPLACEMENT AND POSITIONING COMMAND FOR AXIS
                        UNRELATED TO TOOL REPLACEMENT)
N24 | G1 Y50.          (POSITIONING COMMAND FOR AXIS UNRELATED TO TOOL
                        REPLACEMENT)
N25 | G1 X10. F1000    (CUTTING COMMAND)
       .
       .
       .
```

NUMERICAL CONTROL APPARATUS

CROSS REFERENCE TO RELATED APPLICATIONS

This is a National Stage of International Application No. PCT/JP2012/052609 filed Feb. 6, 2012, the contents of which are incorporated herein by reference in its entirety.

FIELD

The present invention relates to a numerical control apparatus that numerically controls a machine tool that can execute tool replacement.

BACKGROUND

Currently, there is a numerical control apparatus with which a user can cause, by designating a tool from a machining program, a machine tool to perform machining while performing replacement of the tool for each of types of machining. A series of operations for replacing the tool includes movement of a position where the tool replacement is possible, replacement of the tool, and movement to a position where the machining is started. The time required for the series of operations for replacing the tool (a tool replacement time) is the time during which a work is not machined. In the case of machining in which replacement of a tool is frequently performed, the tool replacement time greatly affects a machining time. Therefore, a reduction in the tool replacement time is desired.

On the other hand, Patent Literature 1 discloses a technology for pre-fetching a machining program and, when the next command of a tool replacement command is a positioning command, causing a tool replacing operation and a positioning operation to operate in parallel to effectively use a tool replacement time.

CITATION LIST

Patent Literature

Patent Literature 1: Japanese Patent Application Laid-Open No. H11-300577

SUMMARY

Technical Problem

However, according to the technology described in Patent Literature 1, the positioning command performed in parallel to the tool replacing operation is determined according to only a determination whether or not the positioning command is a cutting command. Therefore, even when there is a positioning command for an axis that should not be moved during the tool replacing operation, the positioning operation is executed in parallel to the tool replacing operation. Therefore, problems occur in that, for example, tool replacement cannot be performed and a tool and a work interfere with each other.

The present invention has been devised in view of the above and it is an object of the present invention to obtain a numerical control apparatus that effectively uses a tool replacement time while preventing interference of a tool and work.

Solution to Problem

In order to solve the aforementioned problems, a numerical control apparatus according to one aspect of the present invention is configured to include: a program analyzing unit configured to pre-fetch, from a machining program, a first command for commanding a tool replacing operation and a second command for commanding only positioning of an axis included in a machine tool, the second command following the first command, and output the first command and the second command; a tool-replacement-command output unit configured to cause, on the basis of the first command output by the program analyzing unit, the machine tool to execute the tool replacing operation; and an axis control unit configured to start, when the second command output by the program analyzing unit is a command for positioning the first axis related to the tool replacing operation, controlling of the first axis based on the second command, after waiting for completion of the tool replacing operation based on the first command, and start, when the second command output by the program analyzing unit is a command for positioning the second axis unrelated to the tool replacing operation, control of the second axis based on the second command, without waiting for the completion of the tool replacement based on the first command.

Advantageous Effects of Invention

The numerical control apparatus according to the present invention starts, when a positioning command for executing only positioning of an axis after a tool replacement command is a command for positioning an axis related to the tool replacing operation, control based on the positioning command, after waiting for completion of the tool replacing operation, and starts, when the positioning command is a command for positioning an axis unrelated to the tool replacing operation, control based on the positioning command, without waiting for the completion of the tool replacement. Therefore, it is possible to effectively use a tool replacement time while preventing interference of a tool and work.

BRIEF DESCRIPTION OF DRAWINGS

FIG. 5-1 is a flowchart explaining the operation of a movement-command determining unit in the first embodiment.

FIG. 5-2 is a flowchart explaining the operation of the movement-command determining unit in the first embodiment.

FIG. 6 is a diagram of a specific example of a machining program.

FIG. 7-1 is a timing chart explaining operations for axes performed when the numerical control apparatus in the first embodiment executes the machining program.

FIG. 7-2 is a timing chart explaining operations for the axes performed when the machining program is sequentially executed for each of blocks.

FIG. 10-1 is a flowchart explaining the operation of a movement-command determining unit in the second embodiment.

FIG. 10-2 is a flowchart explaining the operation of the movement-command determining unit in the second embodiment.

FIG. 10-3 is a flowchart explaining the operation of the movement-command determining unit in the second embodiment.

FIG. 11 is a diagram of a specific example of a machining program.

FIG. 12-1 is a timing chart for explaining operations for axes performed when the numerical control apparatus in the second embodiment executes the machining program.

FIG. 12-2 is a timing chart explaining operations for the axes performed when the machining program is sequentially executed for each of blocks.

DESCRIPTION OF EMBODIMENTS

Embodiments of a numerical control apparatus according to the present invention are explained in detail below with reference to the drawings. Note that the present invention is not limited by the embodiments.

First Embodiment

Figure 1:
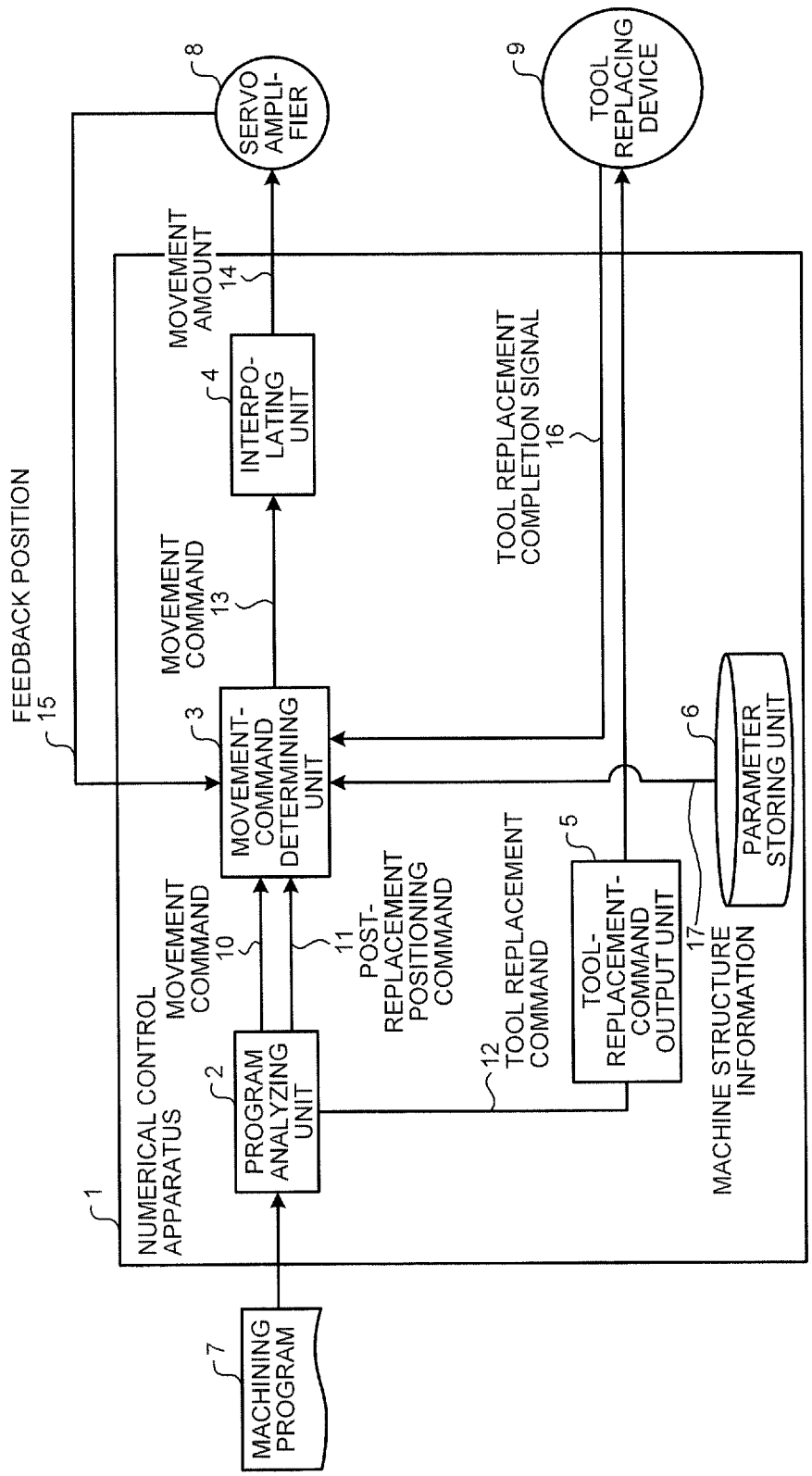
FIG. 1 is a diagram of the configuration of a numerical control apparatus according to a first embodiment.

FIG. 1 is a diagram of the configuration of a numerical control apparatus according to a first embodiment of the present invention. As shown in the figure, a numerical control apparatus 1 includes a program analyzing unit 2, a movement-command determining unit 3, an interpolating unit 4, a tool-replacement-command output unit 5, and a parameter storing unit 6.

The parameter storing unit 6 has stored therein in advance various parameters for the numerical control apparatus 1 to control a machine tool. As one of the parameters, machine structure information 17 is stored. The machine structure information 17 is information describing to which axis an axis related to a tool replacing operation and an axis unrelated to the tool replacing operation correspond.

Figure 2:
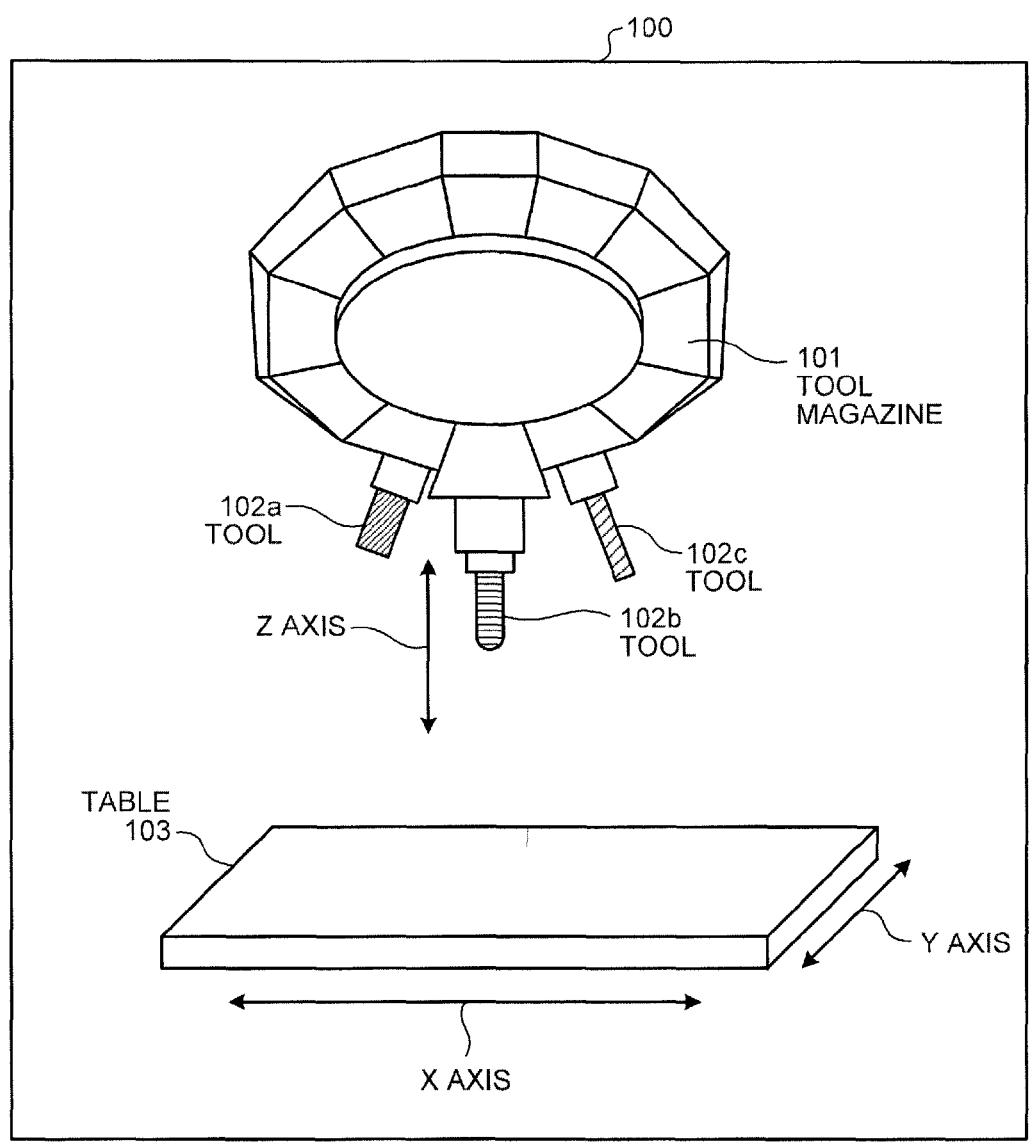
FIG. 2 is a diagram of a machine configuration example of a machine tool controlled by a numerical control apparatus 1.

FIG. 2 is a diagram of a machine configuration example of a machine tool controlled by the numerical control apparatus 1. According to this example, a machine tool 100 includes a tool magazine 101, tools 102a to 102c, and a table 103. A work (not shown in the figure) is fixed to the table 103. The table 103 is driven by X-axis control and Y-axis control. A tool 102b attached to the tool magazine 101 is driven by Z-axis control and machines the work fixed to the table 103. When the tool 102b is replaced with a tool 102a or a tool 102c, after the tool 102b is moved to a tool replacement position on the Z axis, the tool magazine 101 is rotated until the tool 102a or the tool 102c reaches a position where the tool 102a or the tool 102c can be driven by the Z-axis control. When the machine tool 100 is configured in this way, the Z axis needs to stand still in the tool replacement position during the tool replacing operation. Therefore, arbitrary driving of the Z axis is impossible. Arbitrary operation of the X axis and the Y axis is possible during the tool replacing operation. That is, the Z axis corresponds to an axis related to the tool replacing operation. The X axis and the Y axis correspond to axes unrelated to the tool replacing operation. A tool that can be driven by the Z-axis control among the tools 102a to 102c is simply referred to as tool 102.

The program analyzing unit 2 reads a machining program 7 block by block until the program analyzing unit 2 reaches a tool replacement command 12. After reading the tool replacement command 12, the program analyzing unit 2 pre-fetches blocks after the tool replacement command 12 until the program analyzing unit 2 reaches a command that is not a positioning command.

Note that, in the embodiment, the positioning commands refer to commands for causing only the execution of positioning. A positioning command involving machining such as a cutting command is not included in the positioning command in the embodiment. Continuous one or more positioning commands following the tool replacement command 12 are respectively referred to as post-replacement positioning commands (post-replacement positioning commands 11). Positioning commands other than the post-replacement positioning commands 11 and positioning commands involving other operations are simply referred to as movement commands 10. The post-replacement positioning command 11 is sometimes formed by commands for respectively positioning a plurality of axes. The command for each of the axes forming the post-replacement positioning command 11 is referred to as axis component command.

The program analyzing unit 2 outputs, among the read commands, the movement command 10 and the post-replacement positioning command 11 to the movement-command determining unit 3 and outputs the tool replacement command 12 to the tool-replacement-command output unit 5.

The movement-command determining unit 3 and the interpolating unit 4 function as axis control units configured to execute, in cooperation with each other, control of an axis based on the post-replacement positioning command 11 at the timing based on a determination whether the post-replacement positioning command 11 is a command for positioning an axis related to a tool replacing operation.

Specifically, concerning the post-replacement positioning command 11, the movement-command determining unit 3 determines, on the basis of the machine structure information 17 stored in the parameter storing unit 6, for each of axis component commands, whether a commanded axis is related to the tool replacing operation. When the commanded axis is related to the tool replacing operation, waiting for the completion of the tool replacing operation, and when the commanded axis is unrelated to the tool replacing operation, without waiting for the completion of the tool replacing operation, the movement-command determining unit 3 outputs the axis component command to the interpolating unit 4 as a movement command 13. The movement-command determining unit 3 can recognize whether the axes are moving or not moving by checking a feedback position 15 output by a servo amplifier 8. Concerning the movement command 10, the movement-command determining unit 3 outputs axis component commands included in the movement command 10 to the interpolating unit 4 respectively as movement commands 13.

When the movement command 13 is input from the movement-command determining unit 3, the interpolating unit 4 calculates a movement amount 14 for each of interpolation periods on the basis of the input movement command 13 and outputs the calculated movement amount 14 for each of the interpolation periods to the servo amplifier 8 included in the machine tool 100.

When the tool replacement command 12 is input from the program analyzing unit 2, the tool-replacement-command output unit 5 commands a tool replacing device 9 included in the machine tool 100 to replace a tool. In other words, the tool-replacement-command output unit 5 causes, on the basis of the tool replacement command 12 output by the program analyzing unit 2, the machine tool 100 to execute a tool replacing operation. When the replacement of the tool has been completed, the tool replacing device 9 inputs a tool replacement completion signal 16 to the movement-command determining unit 3.

Figure 3:
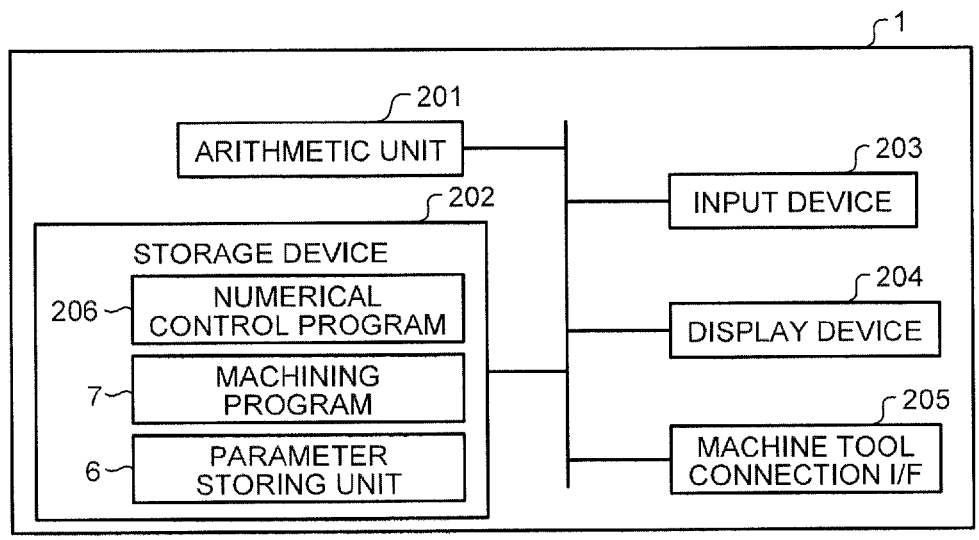
FIG. 3 is a diagram explaining a hardware configuration example of the numerical control apparatus 1.

FIG. 3 is a diagram for explaining a hardware configuration example of the numerical control apparatus 1. As shown in the figure, the numerical control apparatus 1 includes an arithmetic unit 201, a storage device 202, an input device 203, a display device 204, and a machine tool connection interface (I/F) 205. The arithmetic unit 201, the storage device 202, the input device 203, the display device 204, and the machine tool connection I/F 205 are connected to one another by a bus.

The storage device 202 is configured by a nonvolatile memory, a volatile memory, or a combination of the nonvolatile memory and the volatile memory. The storage device 202 has stored therein a machining program 7 and a numerical control program 206 in advance. The storage device 202 has stored parameters therein in advance and functions as the parameter storing unit 6.

The arithmetic unit 201 is, for example, a CPU (Central Processing Unit). The arithmetic unit 201 executes the numerical control program 206 to thereby function as the program analyzing unit 2, the movement-command determining unit 3, the interpolating unit 4, and the tool-replacement-command output unit 5.

The input device 203 is input means for receiving operation to the numerical control apparatus 1 and an input for editing the machining program 7 stored in the storage device 202. The input device 203 is configured by, for example, a keyboard. The display device 204 is configured by a liquid crystal display or the like and displays and outputs display information for a user generated by the arithmetic unit 201. Note that the input device 203 and the display device 204 can be configured by a touch panel device.

The machine tool connection I/F 205 is a connection interface configured to connect the machine tool 100 and the numerical control apparatus 1. Specifically, the machine tool connection I/F 205 transmits the movement amount 14 to the servo amplifier 8 included in the machine tool 100 and receives the feedback position 15 output by the servo amplifier 8. The machine tool connection I/F 205 transmits a tool replacement command to the tool replacing device 9 and receives the tool replacement completion signal 16 output by the tool replacing device 9.

The program analyzing unit 2, the movement-command determining unit 3, the interpolating unit 4, and the tool-replacement-command output unit 5 are explained as being realized by software. However, these functional blocks can be realized as hardware or a combination of the hardware and the software. It is determined on the basis of design limitations imposed on the entire apparatus whether the functional blocks are realized as the hardware or realized as the software.

Figure 4:
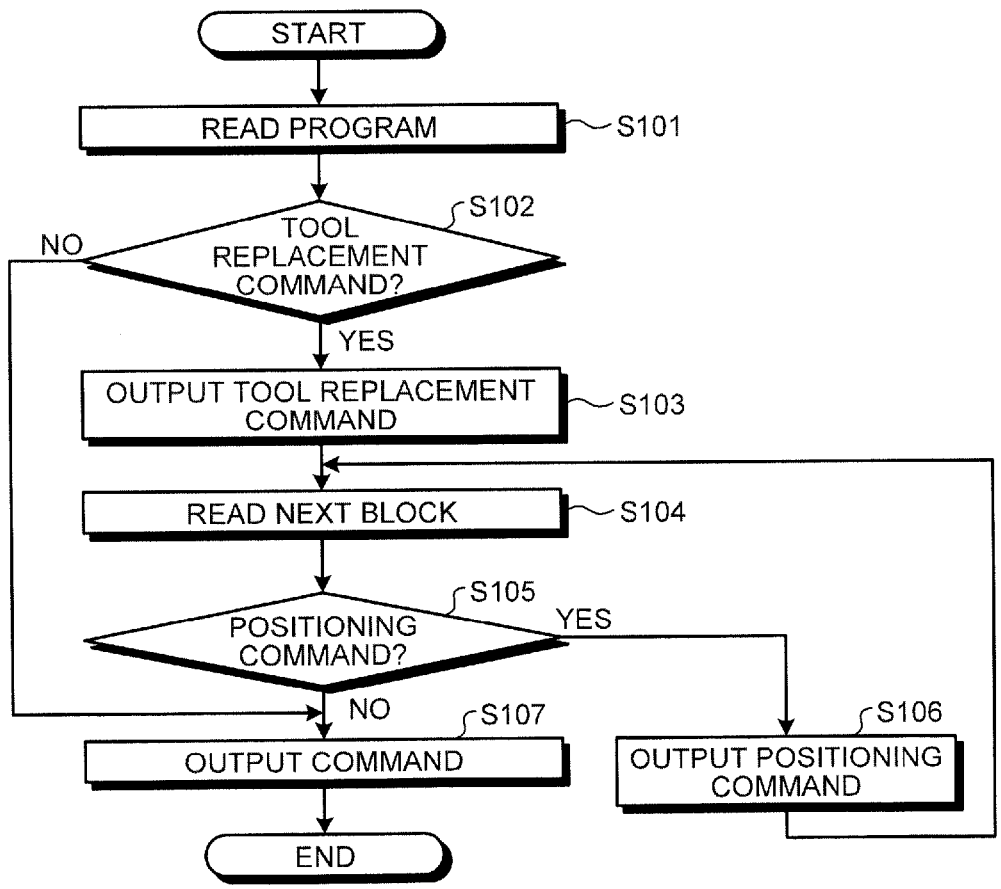
FIG. 4 is a flowchart explaining the operation of a program analyzing unit in the first embodiment.

The operation of the numerical control apparatus 1 in the first embodiment of the present invention is explained. FIG. 4 is a flowchart explaining the operation of the program analyzing unit 2 according to the first embodiment. As shown in the figure, first, the program analyzing unit 2 reads a command described in the machining program 7 by only one block (step S101). The program analyzing unit 2 determines whether the read command is the tool replacement command 12 (step S102). When the read command is not the tool replacement command 12 (No at step S102), the program analyzing unit 2 executes processing at step S107 explained below.

When the read command is the tool replacement command 12 (Yes at step S102), the program analyzing unit 2 outputs the tool replacement command 12 to the tool-replacement-command output unit 5 (step S103). The program analyzing unit 2 reads the next block (step S104) and determines whether or not the read command is a positioning command (i.e., the post-replacement positioning command 11). When the read command is the post-replacement positioning command 11 (Yes at step S105), the program analyzing unit 2 outputs the post-replacement positioning command 11 to the movement-command determining unit 3 (step S106). Thereafter, the program analyzing unit 2 executes the processing at step S104.

When the read command is not the post-replacement positioning command 11 (No at step S105), the read command corresponds to the movement command 10. In that case, the program analyzing unit 2 outputs the movement command 10 to the movement-command determining unit 3 (step S107) and ends the operation.

As explained above, the program analyzing unit 2 outputs the read command to the functional block corresponding to the command block per each block until the tool replacement command 12 is read. When the tool replacement command 12 is read, the program analyzing unit 2 pre-fetches the tool replacement command 12 and the post-replacement positioning command 11 and continuously outputs the pre-fetched commands to the movement-command determining unit 3.

Figures 1, 5:
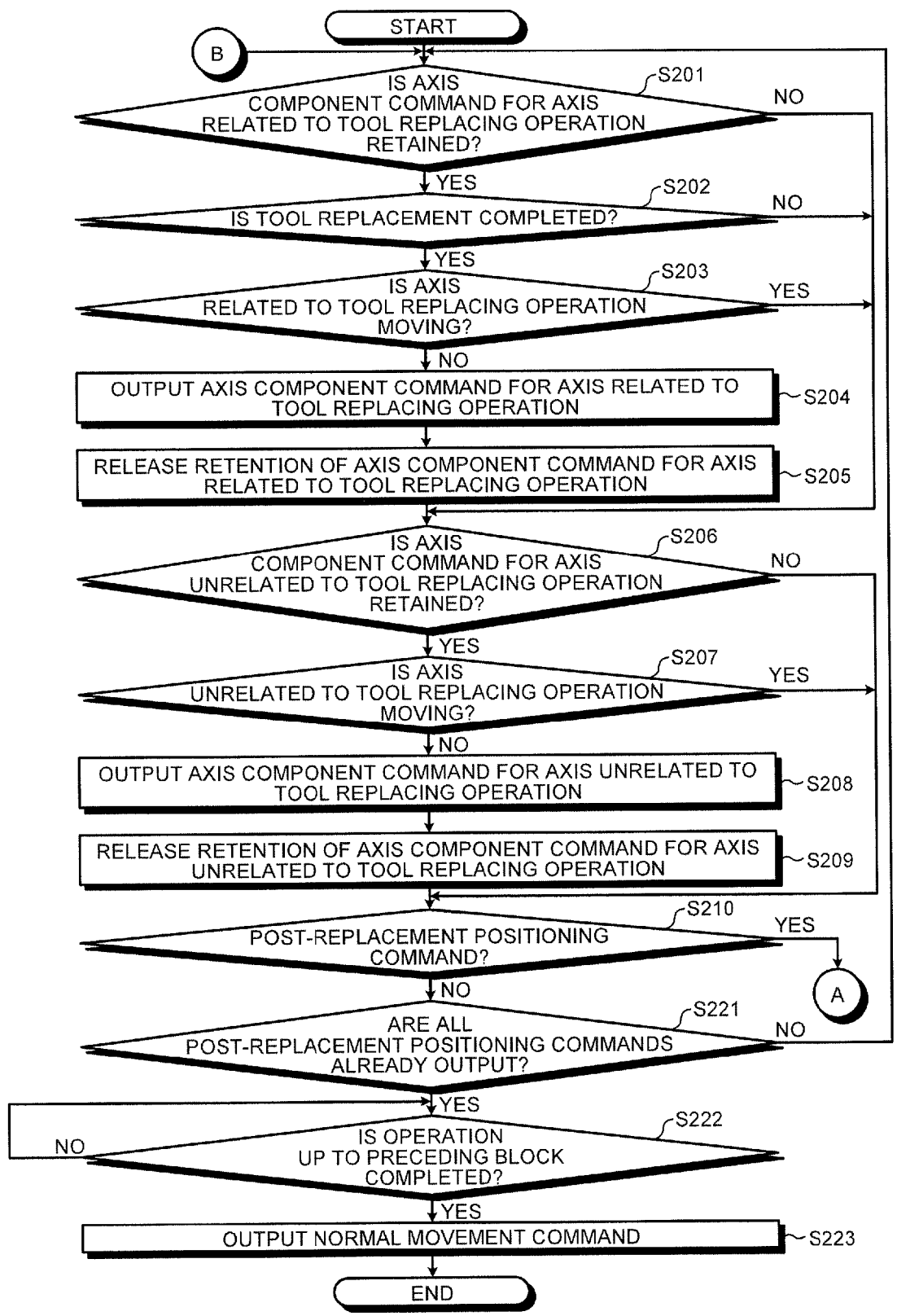
Figures 2, 5:
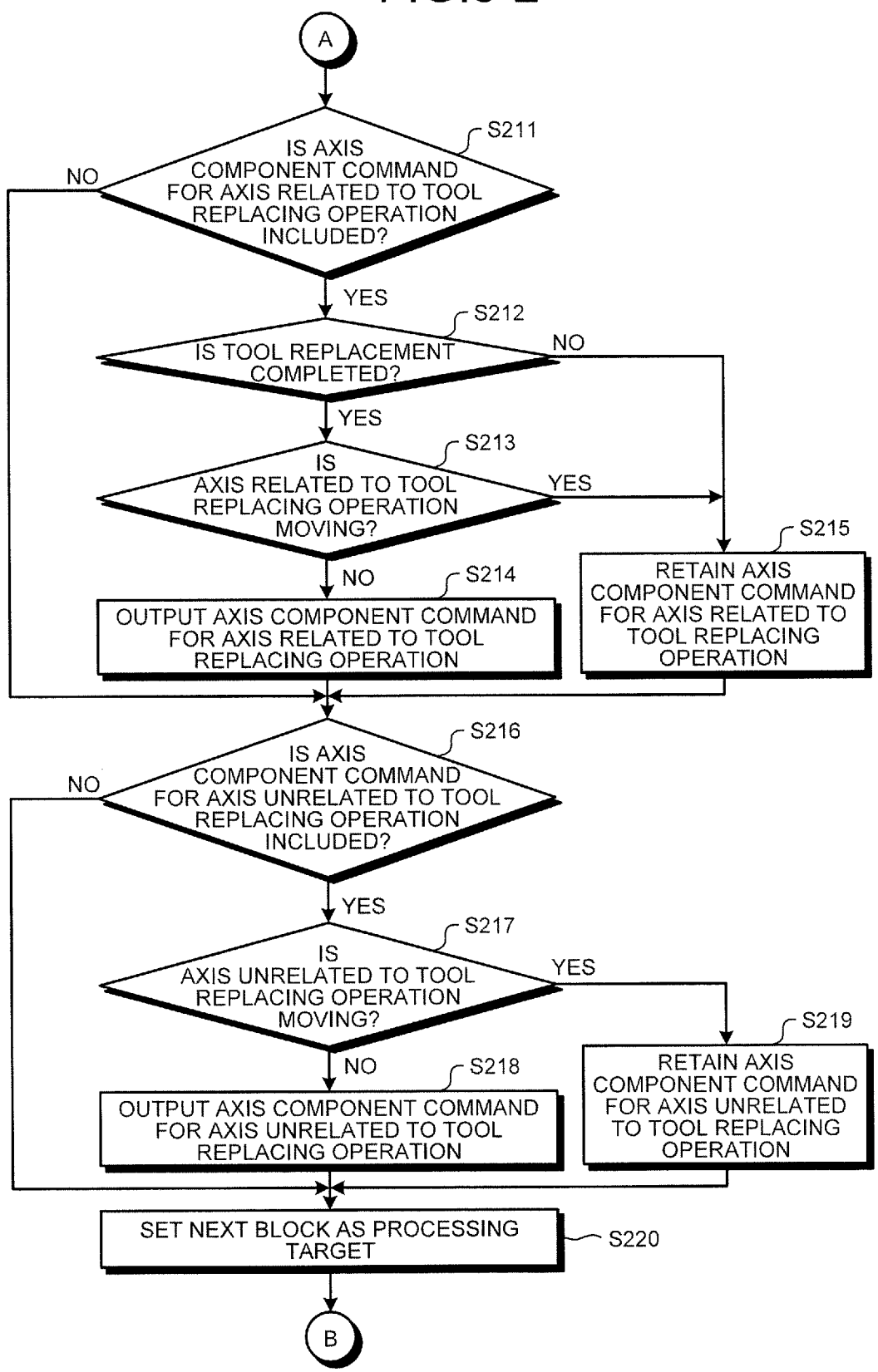

FIGS. 5-1 and FIG. 5-2 are flowcharts for explaining the operation of the movement-command determining unit 3 in the first embodiment. The movement-command determining unit 3 sequentially processes, in the order of the reception, the movement command 10 and the post-replacement positioning command 11 output from the program analyzing unit 2. First, the movement-command determining unit 3 determines whether an axis component command for positioning an axis related to a tool replacing operation has been retained (step S201). The axis component command for the axis related to the tool replacing operation has been retained by processing at step S215 explained later.

When the axis component command for positioning the axis related to the tool replacing operation has been retained (Yes at step S201), the movement-command determining unit 3 refers to the tool replacement completion signal 16 and determines whether the tool replacing operation has been completed (step S202). When the tool replacing operation has been completed (Yes at step S202), the movement-command determining unit 3 refers to the feedback position 15 and determines whether the axis related to the tool replacing operation is moving (step S203). When the axis related to the tool replacing operation is not moving (No at step S203), the movement-command determining unit 3 outputs the retained axis component command to the interpolating unit 4 (step S204) and releases the retention of the axis component command (step S205). Consequently, the interpolating unit 4 starts outputting of the movement amount 14 for each of interpolation periods related to the axis component command.

When the axis component command for positioning the axis related to the tool replacing operation has not been retained (No at step S201), when the tool replacing operation has not been completed (No at step S202), when the axis related to the tool replacing operation is moving (Yes at step S203), or after the processing at step S205, the movement-command determining unit 3 determines whether an axis component command for positioning an axis unrelated to the tool replacing operation has been retained (step S206). The axis component command for positioning the axis unrelated to the tool replacing operation has been retained by processing at step S219 explained later.

When the axis component command for positioning the axis unrelated to the tool replacing operation has been retained (Yes at step S206), the movement-command determining unit 3 refers to the feedback position 15 and determines whether the axis unrelated to the tool replacing operation is moving (step S207). When the axis unrelated to the tool replacing operation is not moving (No at step S207), the movement-command determining unit 3 outputs the retained axis component command to the interpolating unit 4 (step S208) and releases the retention of the axis component command (step S209).

In a case in which the axis component command for positioning the axis unrelated to the tool replacing operation has not been retained (No at step S206), if the axis unrelated to the tool replacing operation is moving (Yes at step S207), or after the processing at step S209, the movement-command determining unit 3 determines whether or not a processing target block is the post-replacement positioning command 11 (step S210). Note that the processing target is sequentially set to a block input following the processing target block according to step S220 explained later.

When the processing target block is the post-replacement positioning command 11 (Yes at step S210), the movement-command determining unit 3 determines whether or not the processing target block includes the axis component command for positioning the axis related to the tool replacing operation (step S211). When the processing target block includes the axis component command for positioning the axis related to the tool replacing operation (Yes at step S211), the movement-command determining unit 3 refers to the tool replacement completion signal 16 and determines whether the tool replacing operation has been completed (step S212). When the tool replacing operation has been completed (Yes at step S212), the movement-command determining unit 3 refers to the feedback position 15 and determines whether the axis related to the tool replacing operation is moving (step S213). When the axis related to the tool replacing operation is not moving (No at step S213), the movement-command determining unit 3 outputs the axis component command for positioning the axis related to the tool replacing operation included in the processing target block to the interpolating unit 4 (step S214).

When the tool replacing operation has not been completed (No at step S212) or when the axis related to the tool replacing operation is moving (Yes at step S213), the movement-command determining unit 3 retains the axis component command for positioning the axis related to the tool replacing operation included in the processing target block, without outputting the axis component command (step S215).

When the processing target block does not include the axis component command for positioning the axis related to the tool replacing operation (No at step S211), after the processing at step S214 or the processing at step S215, the movement-command determining unit 3 determines whether the processing target block includes the axis component command for positioning the axis unrelated to the tool replacing operation (step S216). When the processing target block includes the axis component command for positioning the axis unrelated to the tool replacing operation (Yes at step S216), the movement-command determining unit 3 determines, by referring to the feedback position 15, whether the axis unrelated to the tool replacing operation is moving (step S217). When the axis unrelated to the tool replacing operation is not moving (No at step S217), the movement-command determining unit 3 outputs the axis component command for positioning the axis unrelated to the tool replacing operation included in the processing target block to the interpolating unit 4 (step S218). When the axis unrelated to the tool replacing operation is moving (Yes at step S217), the movement-command determining unit 3 retains the axis component command for positioning the axis unrelated to the tool replacing operation included in the processing target block without outputting the axis component command (step S219).

When the processing target block does not include the axis component command for positioning the axis unrelated to the tool replacing operation (No at step S216), after the processing at step S218 or the processing at step S219, the movement-command determining unit 3 sets a block following the processing target block as the next processing target (step S220) and executes the processing at step S201.

When the processing target block is not the post-replacement positioning command 11 (No at step S210), that is, when the processing target block is the movement command 10, the movement-command determining unit 3 determines whether all the post-replacement positioning commands 11 have been output (step S221). A state in which all the post-replacement positioning commands 11 have been output refers to a state in which all axis component commands included in the post-replacement positioning command 11 have been output. When the post-replacement positioning command 11 that has not been output yet is present (No at step S221), the movement-command determining unit 3 executes the processing at step S201. When all the post-replacement positioning commands 11 have been output (Yes at step S221), the movement-command determining unit 3 refers to the feedback position 15 and determines whether the movement of the axis related to the command up to the preceding block (i.e., the operation up to the preceding block) has been completed (step S222). When the movement of the axis related to the command up to the preceding block has not been completed (No at step S222), the movement-command determining unit 3 executes the processing at step S222 again. When the movement of the axis related to the command up to the preceding block has been completed (Yes at step S222), the movement-command determining unit 3 outputs the movement command 10, which is the processing target block, to the interpolating unit 4 (step S223) and ends the operation.

The operation of the numerical control apparatus 1 in the first embodiment of the present invention is specifically explained with reference to a specific example of the machining program 7. FIG. 6 is a diagram of the specific example of the machining program 7 used in the explanation in the first embodiment. N11 to N14 described for each of lines on the left side of the machining program 7 indicate block numbers of respective commands described in lines corresponding thereto.

The program analyzing unit 2 executes processing explained below on the machining program 7 shown in FIG. 6. First, the program analyzing unit 2 reads the N11 block from the machining program 7 according to the processing at step S101. According to the determination processing at step S102, the program analyzing unit 2 determines that the N11 block is the tool replacement command 12 (Yes at step S102) and outputs the N11 block to the tool-replacement-command output unit 5 (step S103). The program analyzing unit 2 reads the N12 block, which is the next block, according to the processing at step S104. According to the determination processing at step S105, the program analyzing unit 2 determines that the N12 block is the post-replacement positioning command 11 (Yes at step S105) and outputs the N12 block to the movement-command determining unit 3 (step S106).

After outputting the N12 block, the program analyzing unit 2 reads the N13 block according to the processing at step S104. According to the determination processing at step S105, the program analyzing unit 2 determines that the N13 block is the post-replacement positioning command 11 (Yes at step S105) and outputs the N13 block to the movement-command determining unit 3 (step S106). The program analyzing unit 2 reads the N14 block according to the processing at step S104. The N14 block is a cutting command, that is, the movement command 10. Therefore, according to the determination processing at step S105, the program analyzing unit 2 determines that the N14 block is not the post-replacement positioning command 11 (No at step S105) and outputs the N14 block to the movement command determining unit 3 (step S107).

As explained above, the program analyzing unit 2 outputs the N11 block, which is the tool replacement command 12, to the tool-replacement-command output unit 5, outputs the N12 block and the N13 block, which are the post-replacement positioning commands 11, to the movement-command determining unit 3, and outputs the N14 block, which is the movement command 10, to the movement-command determining unit 3.

The movement-command determining unit 3 executes processing explained below on the N12 block to N14 block sent from the program analyzing unit 2. First, according to the determination processing at step S201, the movement-command determining unit 3 determines that the axis component command for positioning the axis related to the tool replacing operation has not been retained (No at step S201). According to the determination processing at step S206, the movement-command determining unit 3 determines that the axis component command for positioning the axis unrelated to the tool replacing operation has not been retained (No at step S206). According to the processing at step S210, the movement-command determining unit 3 determines that the N12 block is the post-replacement positioning command 11 (Yes at step S210). The N12 block is formed by only an axis component command for positioning the Z axis, which is the axis related to the tool replacing operation. Therefore, according to the determination processing at step S211, the movement-command determining unit 3 determines that the processing target block (the N12 block) includes the axis component command for positioning the axis related to the tool replacing operation (Yes at step S211). If the tool replacing operation has not been completed, according to the determination processing at step S212, movement-command determining unit 3 determines that the tool replacing operation has not been completed (No at step S212) and retains the axis component command forming the N12 block (step S215). According to the determination processing at step S216, the movement-command determining unit 3 determines that the processing target block does not include the axis component command for positioning the axis unrelated to the tool replacing operation (No at step S216), sets the following N13 block as the processing target block, and executes the determination processing at step S201.

At this point, only the axis component command for the Z axis, which forms the N11 block, is in the retained state. Therefore, according to the determination processing at step S201, the movement-command determining unit 3 determines that the axis component command for positioning the axis related to the tool replacing operation has been retained (Yes at step S201). If the tool replacing operation has not been completed yet, according to the determination processing at step S202, the movement-command determining unit 3 determines that the tool replacing operation has not been completed yet (No at step S202). According to the determination processing at step S206, the movement-command determining unit 3 determines that the axis component command for positioning the axis unrelated to the tool replacing operation has not been retained (No at step S206). The N13 block, which is the processing target block, is the post-replacement positioning command 11. Therefore, according to the determination processing at step S210, the movement-command determining unit 3 determines that the N13 block is the post-replacement positioning command 11 (Yes at step S210). The N13 block is formed by axis component commands for respectively positioning the X axis and the Y axis, which are axes unrelated to the tool replacing operation. Therefore, according to the determination processing at step S211, the movement-command determining unit 3 determines that the processing target block does not include the axis component command for positioning the axis related to the tool replacing operation (No at step S211). According to the determination processing at step S216, the movement-command determining unit 3 determines that the processing target block includes the axis component command for positioning the axis unrelated to the tool replacing operation (Yes at step S216). According to the determination processing at step S217, the movement-command determining unit 3 determines that the axis unrelated to the tool replacing operation is not moving (No at step S217). According to the processing at step S218, the movement-command determining unit 3 outputs the axis component commands for the X axis and the Y axis forming the N13 block to the interpolating unit 4. According to the processing at step S220, the movement-command determining unit 3 sets the N14 block as the processing target block and executes the processing at step S201.

At this point, the axis component command for the Z axis forming the N11 block is still in the retained state. Therefore, according to the processing at step S201, the movement-command determining unit 3 determines that the axis component command for the axis related to the tool replacing operation has been retained (Yes at step S201). If the tool replacing operation has not been completed yet, according to the determination processing at step S202, the movement-command determining unit 3 determines that the tool replacing operation has not been completed yet (No at step S202). The axis component command for positioning the axis unrelated to the tool replacing operation has not been retained. Therefore, according to the determination processing at step S206, the movement-command determining unit 3 determines that the axis component command for positioning the axis unrelated to the tool replacing operation has not been retained (NO step S206). The N14 block is the movement command 10. Therefore, according to the determination processing at step S210, the movement-command determining unit 3 determines that the N14 block is not the post-replacement positioning command 11 (No at step S210). At this point, the axis component command for the Z axis forming the N11 block is still in the retained state. Therefore, in the determination processing at step S221, the movement-command determining unit 3 determines that the post-replacement positioning command 11 that has not been output yet is present (No at step S211) and executes the determination processing at step S201.

Subsequently, according to the processing at step S201, the movement-command determining unit 3 determines that the axis component command for the axis related to the tool replacing operation has been retained (Yes at step S201). If the tool replacing operation has been completed, according to the determination processing at step S202, the movement-command determining unit 3 determines that the tool replacing operation has been completed (Yes at step S202). According to the determination processing at step S203, the movement-command determining unit 3 determines that the axis related to the tool replacing operation is not moving (No at step S203), outputs the retained axis component command for the Z axis to the interpolating unit 4 (step S204), and releases the retention of the axis component command for the Z axis (step S205). The N14 block is the movement command 10. Therefore, according to the determination processing at step S210, the movement-command determining unit 3 determines that the N14 block, which is the processing target block, is not the post-replacement positioning command 11 (No at step S210). In the determination processing at step S221, the movement-command determining unit 3 determines that all the post-replacement positioning commands 11 have already been output (Yes at step S211). By repeating the determination processing at step S222, the movement-command determining unit 3 waits for the movement of the axes for the N11 block to the N13 block to be completed. After the movement completion, the movement-command determining unit 3 outputs the cutting command for the N14 block, which is the movement command 10, to the interpolating unit 4 (step S223) and ends the operation.

Figures 1, 7:
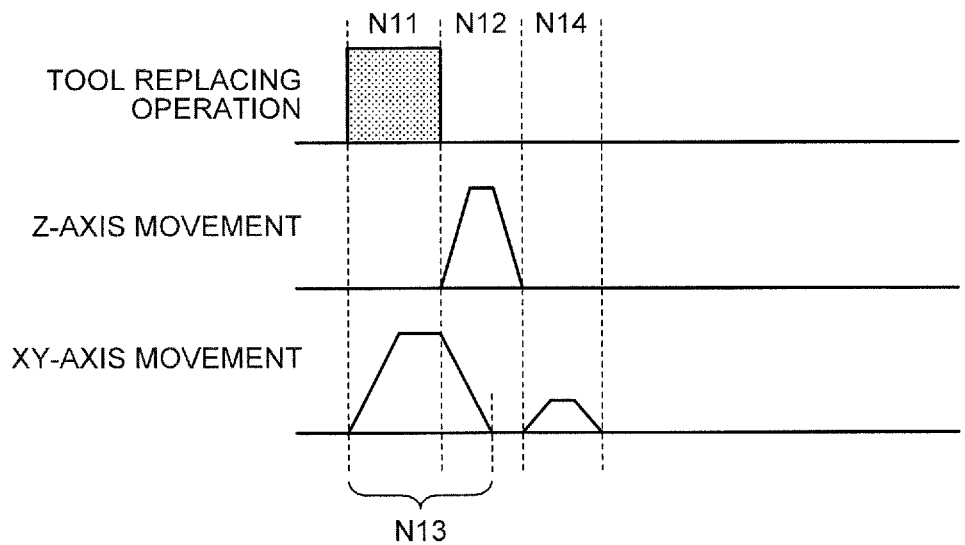
Figures 2, 7:
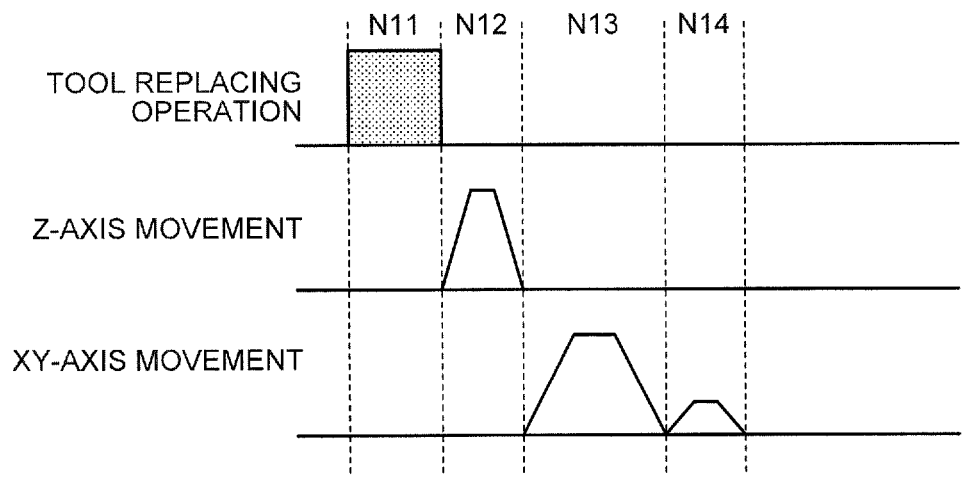

FIG. 7-1 is a timing chart explaining operations for the axes performed when the numerical control apparatus 1 executes the machining program 7 shown in FIG. 6. In FIG. 7-2, as a comparative example of the first embodiment, a timing chart explaining operations for the axes performed when the machining program 7 is sequentially executed for each of blocks is shown. As shown in the figure, with the numerical control apparatus 1 according to the first embodiment, the positioning operation (N13) for the X axis and the Y axis is started simultaneously with the tool replacing operation (N11). The positioning operation (N12) for the Z axis is started after completion of the tool replacing operation (N11). The cutting operation (N14) for the X axis is started after completion of the positioning operation (N13) for the Y axis and the positioning operation (N12) for the Z axis. According to the timing chart, it is seen that the positioning operation (N13) is executed in parallel during execution of the tool replacing operation (N11) and a tool replacement time is effectively used. Rather than the positioning operation (N12) for the Z axis, which is the axis related to the tool replacing operation, the positioning operation (N13) for the X axis or the Y axis, which is the axis unrelated to the tool replacing operation, is executed in parallel to the tool replacing operation (N11). Therefore, it is possible to prevent interference of a tool and work. On the other hand, according to the comparative example, it is seen that, because the N11 block to N14 block are sequentially executed, longer time is required than when the numerical control apparatus 1 applied with the first embodiment executes the machining program 7. That is, by applying the first embodiment to the numerical control apparatus, it is possible to effectively use the tool replacement time while preventing interference of a tool and a work, so that it is possible to reduce a machining time compared with the comparative example.

Note that, in the above explanation, the machine configuration example shown in FIG. 2 is explained as the machine configuration example of the machine tool controlled by the numerical control apparatus 1. However, the numerical control apparatus 1 can control any machine tool as long as tool replacement is possible in the machine tool.

As explained above, according to the first embodiment, the numerical control apparatus 1 includes the program analyzing unit 2 configured to pre-fetch the tool replacement command 12 and the post-replacement positioning command 11 from the machining program 7 and output the commands, the tool-replacement-command output unit 5 configured to cause, on the basis of the tool replacement command 12 output by the program analyzing unit 2, the machine tool 100 to execute the tool replacing operation, the movement-command determining unit 3 and the interpolating unit 4 configured to start, when the post-replacement positioning command 11 output by the program analyzing unit 2 is the axis component command for positioning an axis related to the tool replacing operation, waiting for the completion of the tool replacing operation, controlling of the axis based on the axis component command and start, when the post-replacement positioning command 11 output by the program analyzing unit 2 is an axis component command for positioning an axis unrelated to the tool replacing operation, without waiting for the completion of the tool replacing operation, controlling of the axis based on the axis component command. Therefore, the numerical control apparatus 1 can efficiently use a tool replacement time while preventing interference of the tool 102 and a work.

The command determining unit 3 and the interpolating unit 4 are configured to start, when the post-replacement positioning command 11 output by the program analyzing unit 2 includes an axis component command for positioning an axis related to a tool replacing operation and an axis component command for positioning an axis unrelated to the tool replacing operation, waiting for completion of the tool replacing operation, control based on the axis component command for positioning the axis related to the tool replacing operation included in the post-replacement positioning command 11, and start, without waiting for the completion of the tool replacing operation, controlling based on the axis component command for positioning the axis unrelated to the tool replacing operation included in the post-replacement positioning command 11. Therefore, even when the post-replacement positioning command 11 includes the axis component command for positioning the axis related to the tool replacing operation and the axis component command for positioning the axis unrelated to the tool replacing operation, the numerical control apparatus 1 can adjust timing for the control start for each of the axes. Therefore, it is possible to effectively use a tool replacement time.

Second Embodiment

As explained above, before the tool replacing operation is executed, the tool is moved to a tool replacement position on the Z axis. A numerical control apparatus in a second embodiment starts a positioning operation for an axis unrelated to a tool replacing operation when a tool reaches a position set in advance where it is guaranteed that the tool and the work do not interfere with each other halfway in moving the tool to the tool replacing position. Consequently, it is possible to further reduce a machining time than the numerical control apparatus 1 of the first embodiment.

Figure 8:
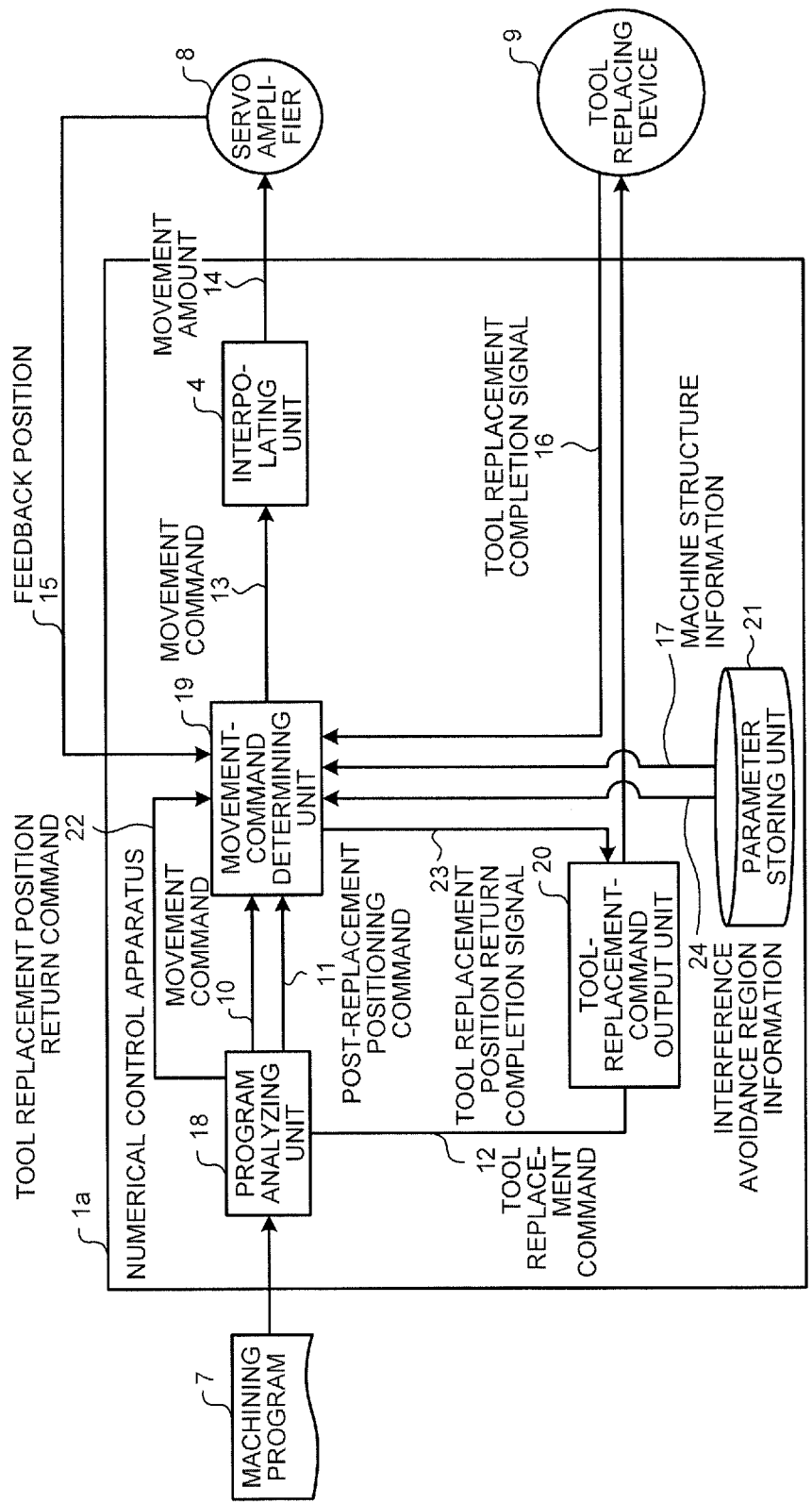
FIG. 8 is a diagram of the configuration of a numerical control apparatus according to a second embodiment.

FIG. 8 is a diagram of the configuration of the numerical control apparatus according to the second embodiment of the present invention. Note that, among components included in a numerical control apparatus 1a in the second embodiment, components having functions same as the functions in the first embodiment are denoted by the same reference numerals and signs and redundant operation of the components is omitted.

The numerical control apparatus 1a in the second embodiment includes a program analyzing unit 18, a movement-command determining unit 19, the interpolating unit 4, a tool-replacement-command output unit 20, and a parameter storing unit 21.

The parameter storing unit 21 stores interference avoidance region information 24 besides the machine structure information 17. The interference avoidance region information 24 is information describing an operation region (an interference avoidance region) of an axis related to a tool replacing operation where it is guaranteed that the tool 102 and the work do not interfere with each other.

The program analyzing unit 18 reads the machining program 7 block by block until the program analyzing unit 18 reaches the tool replacement command 12. After reading a tool replacement position return command 22, the program analyzing unit 18 outputs the tool replacement position return command 22 to the movement-command determining unit 19. The tool replacement position return command 22 is a command for moving the tool 102 (in other words, an axis related to the tool replacing operation) to a tool replacement position. Note that an operation for moving the tool 102 to the tool replacement position is referred to as replacement position return operation.

After reading the tool replacement command 12, the program analyzing unit 18 pre-fetches blocks after the tool replacement command 12 until the program analyzing unit 18 reaches a command that is not a positioning command. The program analyzing unit 18 outputs, among the read commands, the movement command 10 and the post-replacement positioning command 11 to the movement-command determining unit 19 and outputs the tool replacement command 12 to the tool-replacement-command output unit 20.

When the tool replacement position return command 22 is input, the movement-command determining unit 19 outputs the movement command 13 for the replacement position return operation to the interpolating unit 4. During execution of the replacement position return operation, when the axis related to the tool replacing operation reaches a position determined in accordance with the interference avoidance region information 24, the movement-command determining unit 19 outputs the post-replacement positioning command 11 that can be executed in parallel. When the replacement position return operation has been completed, the movement-command determining unit 19 outputs a tool replacement position return completion signal 23 to the tool-replacement-command output unit 20.

Concerning the movement command 10, the movement-command determining unit 19 outputs axis component commands included in the movement command 10 to the interpolating unit 4 respectively as the movement commands 13. Concerning the post-replacement positioning command 11, the movement-command determining unit 19 determines, on the basis of the machine structure information 17 stored in the parameter storing unit 21, for each of the axis component commands, whether a commanded axis is related to the tool replacing operation. When the commanded axis is related to the tool replacing operation, waiting for completion of the tool replacing operation and, when the commanded axis is unrelated to the tool replacing operation, without waiting for the completion of the tool replacing operation, the movement-command determining unit 19 outputs the axis component command to the interpolating unit 4 as the movement command 13. Note that the movement-command determining unit 19 can recognize whether the axes are moving or not moving by checking the feedback position 15 output by a servo amplifier 8.

When the tool replacement command 12 is input from the program analyzing unit 18, after the completion of the replacement position return operation, the tool-replacement-command output unit 20 commands the tool replacing device 9 included in the machine tool 100 to replace a tool. The tool-replacement-command output unit 20 determines, by referring to the tool replacement position return completion signal 23, whether the replacement position return operation has been completed. When the replacement of the tool has been completed, the tool replacing device 9 input the tool replacement completion signal 16 to the movement-command determining unit 19.

Figure 9:
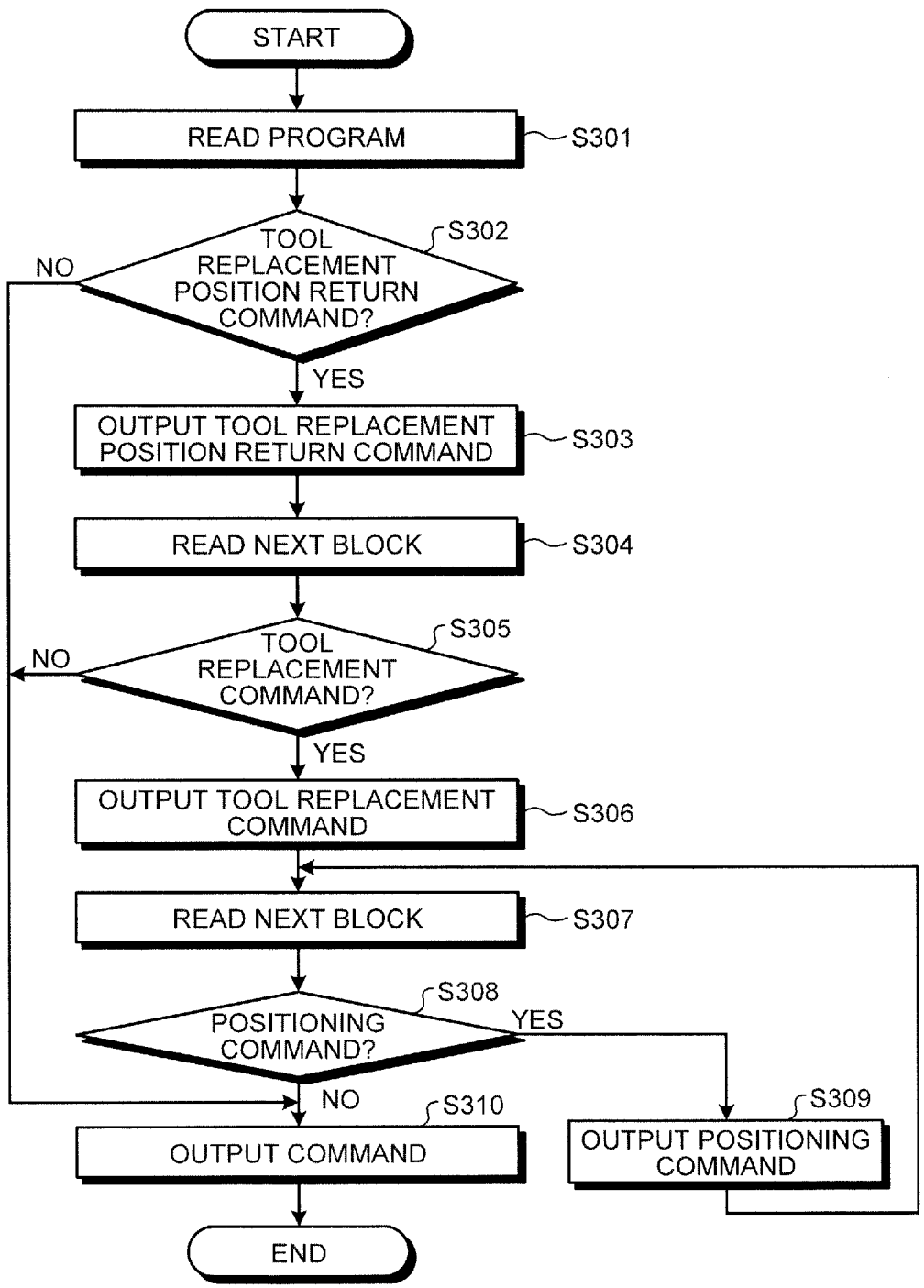
FIG. 9 is a flowchart explaining the operation of a program analyzing unit in the second embodiment.
Figures 1, 10:
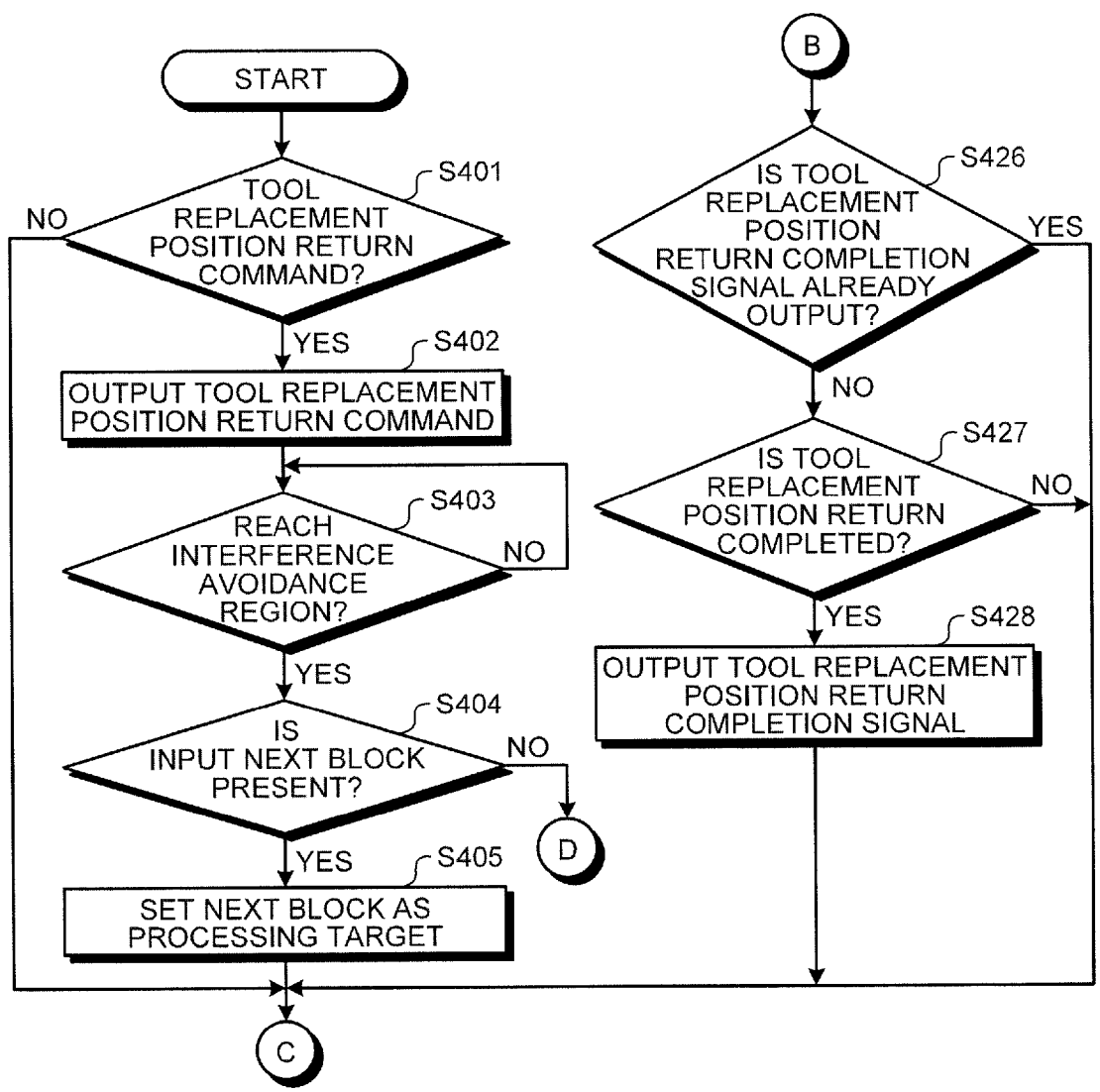
Figures 2, 10:
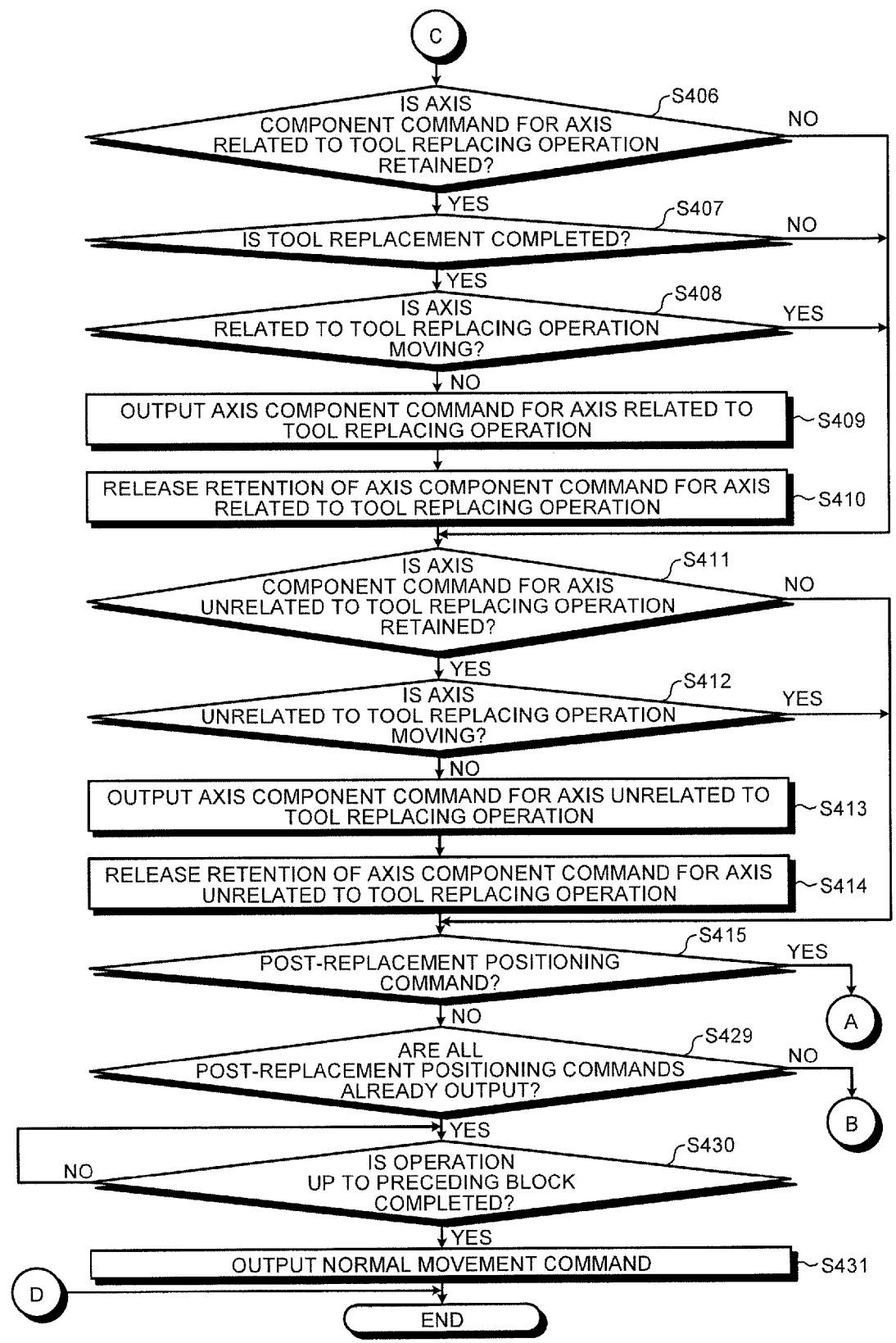
Figures 3, 10:
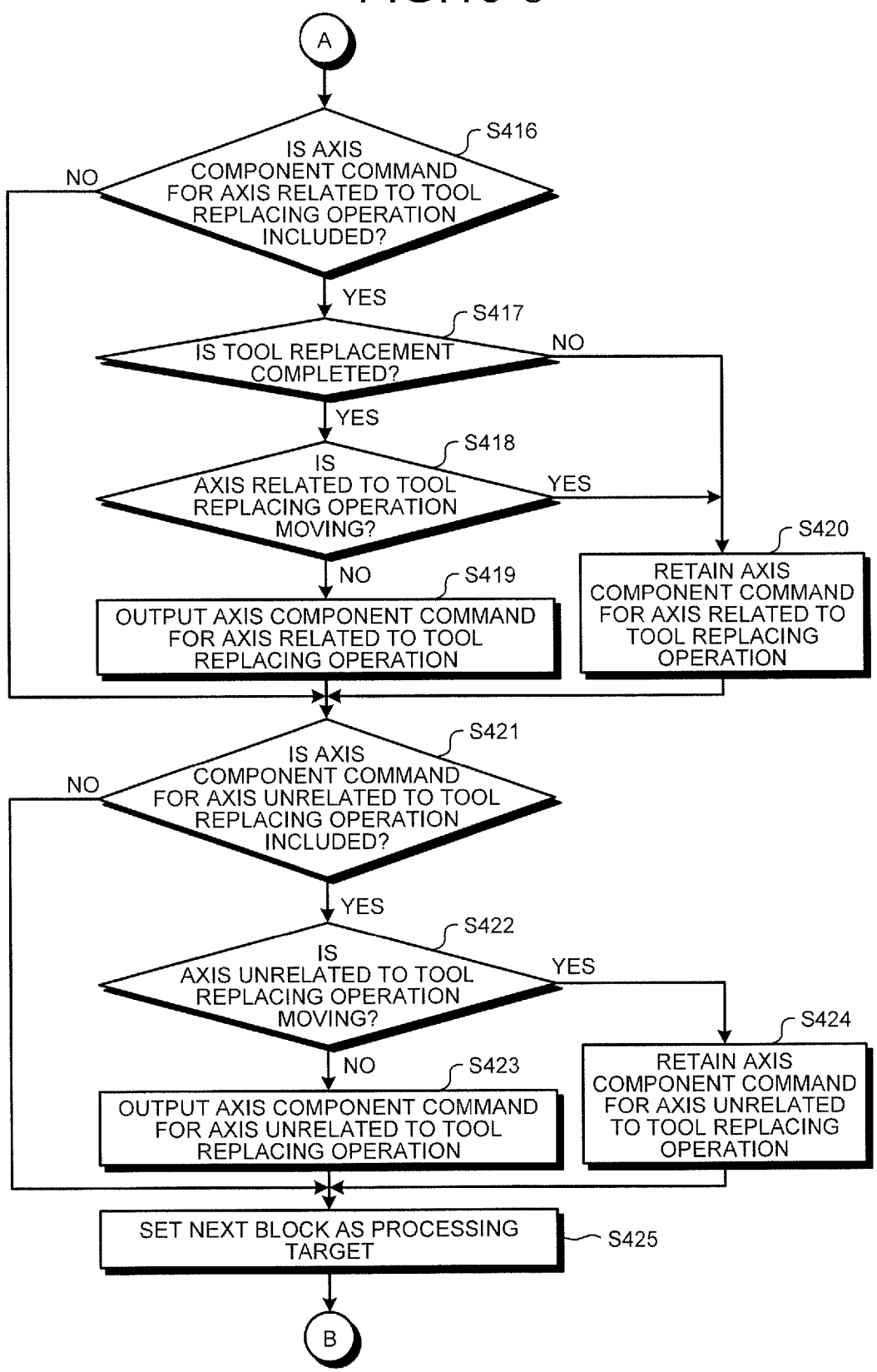

FIG. 9 is a flowchart explaining the operation of the program analyzing unit 18 according to the second embodiment. As shown in the figure, first, the program analyzing unit 18 reads a command described in the machining program 7 by one block (step S301). The program analyzing unit 18 determines whether the read command is the tool replacement position return command 22 (step S302). When the read command is not the tool replacement position return command 22 (No at step S302), the program analyzing unit 18 executes processing at step S310 explained later.

When the read command is the tool replacement position return command 22 (Yes at step S302), the program analyzing unit 18 outputs the tool replacement position return command 22 to the movement-command determining unit 19 (step S303). The program analyzing unit 18 reads the next block (step S304) and determines whether the read command is the tool replacement command 12 (S305). When the read command is not the tool replacement command 12 (No at step S305), the program analyzing unit 18 executes the processing at step S310.

When the read command is the tool replacement command 12 (Yes at step S305), the program analyzing unit 18 outputs the tool replacement command 12 to the tool-replacement-command output unit 20 (step S306). The program analyzing unit 18 reads the next block (step S307) and determines whether the read command is a positioning command (i.e., the post-replacement positioning command 11) (step S308). When the read command is the post-replacement positioning command 11 (Yes at step S308), the program analyzing unit 18 outputs the post-replacement positioning command 11 to the movement-command determining unit 19 (step S309). Thereafter, the program analyzing unit 18 executes the processing at step S307.

When the read command is not the post-replacement positioning command 11 (No at step S308), the read command corresponds to the movement command 10. The program analyzing unit 18 outputs the movement command 10 to the movement-command determining unit 19 (step S310) and ends the operation.

FIG. 10-1, FIG. 10-2, and FIG. 10-3 are flowcharts explaining the operation of the movement-command determining unit 19 in the second embodiment. The movement-command determining unit 19 sequentially processes the movement command 10, the post-replacement positioning command 11, and the tool replacement position return command 22 output from the program analyzing unit 18. First, the movement-command determining unit 19 determines whether a processing target block is the tool replacement position return command 22 (step S401). When the processing target block is not the tool replacement position return command 22 (No at step S401), the movement-command determining unit 19 executes processing at step S406 explained later. When the processing target block is the tool replacement position return command 22 (Yes at step S401), the movement-command determining unit 19 outputs the tool replacement position return command 22 to the interpolating unit 4 (step S402). To move the position of the tool 102 to the tool replacement position, the interpolating unit 4 calculates the movement amount 14 for each of interpolation periods and sequentially outputs the calculated movement amount 14 for each of the interpolation periods to the servo amplifier 8.

Thereafter, the movement-command determining unit 19 determines, on the basis of the feedback position 15 of an axis for moving the tool 102 (i.e., the Z axis, which is the axis related to the tool replacing operation) and the interference avoidance region, whether the tool 102 has reached the interference avoidance region (step S403). When the tool 102 has not reached the interference avoidance region (No at step S403), the movement-command determining unit 19 executes the determination processing at step S403 again.

When the tool 102 reaches the interference avoidance region (Yes at step S403), the movement-command determining unit 19 determines whether a block following the processing target block has been input (step S404). When a block following the processing target block has not been input (No at step S404), the movement-command determining unit 19 ends the operation. When a block following the processing target block has been input (Yes at step S404), the movement-command determining unit 19 sets the next block as the processing target (step S405).

The movement-command determining unit 19 determines whether the axis component command for positioning the axis related to the tool replacing operation has been retained (step S406). Processing at step S406 to step S425 by the movement-command determining unit 19 is the same as steps S201 to S220 by the movement-command determining unit 3 in the first embodiment. Therefore, explanation of the processing at step S406 to step S425 is omitted.

After setting the following block as the next processing target according to the processing at step S425, the movement-command determining unit 19 determines whether the tool replacement position return completion signal 23 has already been output (step S426). When the tool replacement position return completion command 23 has not been output (No at step S426), the movement-command determining unit 19 determines whether movement (return) of the tool 102 to the tool replacement position has been completed (step S427). When the return of the tool 102 to the tool replacement position has been completed (Yes at step S427), the movement-command determining unit 19 outputs the tool replacement position return completion signal 23 to the tool-replacement-command output unit 20 (step S428).

In a case in which the tool replacement position return completion signal 23 has been output (Yes at step S426), if the return of the tool 102 to the tool replacement position has not been completed (No at step S427), or after the processing at step S428, the movement-command determining unit 19 executes the processing at step S406.

When a determination result by the determination processing at step S415 is No, that is, the processing target block is not the post-replacement positioning command 11, the movement-command determining unit 19 determines whether all the post-replacement positioning commands 11 have been output (step S429). When the post-replacement positioning command 11 that has not been output yet is present (No at step S429), the movement-command determining unit 19 executes the processing at step S426. When all the post-replacement positioning commands 11 have been output (Yes at step S429), the movement-command determining unit 19 refers to the feedback position 15 and determines whether the operation up to the preceding block has been completed (step S430). When movement of an axis for a command up to the preceding block has not been completed (No at step S430), the movement-command determining unit 19 executes the processing at step S430 again. When the movement of the axis for the command up to the preceding block has been completed (Yes at step S430), the movement-command determining unit 19 outputs the movement command 10, which is the processing target block, to the interpolating unit 4 (step S431) and ends the operation.

The operation of the numerical control apparatus 1a in the second embodiment of the present invention is specifically explained with reference to a specific example of the machining program 7. FIG. 11 is a diagram of the specific example of the machining program 7 used in the explanation in the second embodiment. N21 to N25 described for each of lines on the left side of the machining program 7 indicate block numbers of each of commands described in lines corresponding thereto.

The program analyzing unit 18 executes processing explained below on the machining program 7 shown in FIG. 11. First, the program analyzing unit 18 reads the N21 block from the machining program 7 according to the processing at step S301. According to the determination processing at step S302, the program analyzing unit 18 determines that the N21 block is the tool replacement position return command 22 (Yes at step S302). According to the processing at step S303, the program analyzing unit 18 outputs the N21 block to the movement-command determining unit 19. According to the processing at step S304, the program analyzing unit 18 reads the N22 block following the N21 block. According to the determination processing at step S305, the program analyzing unit 18 determines that the read N22 block is the tool replacement command 12 (Yes at step S305). According to the processing at step S306, the program analyzing unit 18 outputs the N22 block to the tool-replacement-command output unit 20. According to the processing at step S307, the program analyzing unit 18 reads the N23 block following the N22 block. According to the determination processing at step S308, the program analyzing unit 18 determines that the read N23 block is the post-replacement positioning command 11 (Yes at step S308). According to the processing at step S309, the program analyzing unit 18 outputs the N23 block to the movement-command determining unit 19. Thereafter, according to loop processing at step S307, Yes at step S308, and step S309 and the processing at step S310, the program analyzing unit 18 outputs the N24 block, which is the post-replacement positioning command 11, and the N25 block, which is the movement command 10, to the movement-command determining unit 19.

As explained above, the program analyzing unit 18 outputs the N22 block, which is the tool replacement command 12, to the tool-replacement-command output unit 20 and outputs the N21 block, which is the tool replacement position return command 22, the N23 block and the N24 block, which are the post-replacement positioning commands 11, and the N25 block, which is the movement command 10, to the movement-command determining unit 19.

The movement-command determining unit 19 executes processing explained below on the N21 block and the N23 block to N25 block sent from the program analyzing unit 18. First, according to the determination processing at step S401, the movement-command determining unit 19 determines that the N21 block, which is a first processing target block, is the tool replacement position return command 22 (step S401). According to the processing at step S402, the movement-command determining unit 19 outputs the tool replacement position return command 22 to the interpolating unit 4. By repeating the determination processing at step S403, the movement-command determining unit 19 waits for the tool 102 to reach the interference avoidance region. After the tool 102 has reached the interference avoidance region, the movement-command determining unit 19 executes the determination processing at step S404 and determines that the next block is present (Yes at step S404). According to the processing at step S405, the movement-command determining unit 19 sets the N23 block, which is the next block, as the processing target block.

Subsequently, according to the determination processing at step S406, the movement-command determining unit 19 determines that the axis component command for positioning the axis related to the tool replacing operation has not been retained (No at step S406). According to the determination processing at step S411, the movement-command determining unit 19 determines that the axis component command for positioning the axis unrelated to the tool replacing operation has not been retained (No at step S411). According to the processing at step S415, the movement-command determining unit 19 determines that the N23 block is the post-replacement positioning command 11 (Yes at step S415).

The N23 block is formed by an axis component command for positioning the Z axis, which is the axis related to the tool replacing operation, and an axis component command for positioning the X axis, which is the axis unrelated to the tool replacing operation. Therefore, according to the determination processing at step S416, the movement-command determining unit 19 determines that the processing target block (the N23 block) includes the axis component command for positioning the axis related to the tool replacing operation (Yes at step S416). If the tool replacing operation has not been completed, according to the determination processing at step S417, the movement-command determining unit 19 determines that the tool replacing operation has not been completed (No at step S417) and retains the axis component command for the Z axis included in the N23 block (step S420). The N23 block includes an axis component command for the X axis. Therefore, according to the determination processing at step S421, the movement-command determining unit 19 determines that the processing target block includes the axis component command for positioning the axis unrelated to the tool replacing operation (Yes at step S421). According to the determination processing at step S422, the movement-command determining unit 19 determines that the axis unrelated to the tool replacing operation is not moving (No at step S422). According to the processing at step S423, the movement-command determining unit 19 outputs the axis component command for the X axis included in the N23 block to the interpolating unit 4. According to the processing at step S425, the movement-command determining unit 19 sets the following N24 block as the processing target block.

Subsequently, according to the determination processing at step S426, the movement-command determining unit 19 determines that the tool replacement position return completion signal 23 has not been output (No at step S426). When the return of the tool 102 to the tool replacement position has not been completed at this point, according to the determination processing at step S427, the movement-command determining unit 19 determines that the tool 102 has not returned to the tool replacement position (No at step S427).

At this point, only the axis component command for the Z axis included in the N23 block has been retained. Therefore, according to the determination processing at step S406, the movement-command determining unit 19 that the axis component command for positioning the axis related to the tool replacing operation has been retained (Yes at step S406). If the tool replacing operation has not been completed at this point, according to the determination processing at step S407, the movement-command determining unit 19 determines that the tool replacing operation has not been completed (No at step S407). According to the determination processing at step S411, the movement-command determining unit 19 determines that the axis component command for positioning the axis unrelated to the tool replacing operation has not been retained (No at step S411).

Subsequently, according to the determination processing at step S415, the movement-command determining unit 19 determines that the N24 block, which is the processing target block, is the post-replacement positioning command 11 (Yes at step S415). The N24 block includes only an axis component command for positioning the Y axis unrelated to the tool replacing operation. Therefore, the movement-command determining unit 19 determines No in the determination processing at step S416 and determines Yes at the determination processing at step S421. At this point, if movement of the X axis according to the axis component command forming the N23 block has not been completed, according to the processing at step S422, the movement-command determining unit 19 determines that the axis unrelated to the tool replacing operation is moving (Yes at step S422). According to the processing at step S424, the movement-command determining unit 19 retains the axis component command for positioning the Y axis forming the N24 block. According to the processing at step S425, the movement-command determining unit 19 sets the following N25 block as the processing target block.

Subsequently, according to the determination processing at step S426, the movement-command determining unit 19 determines that the tool replacement position return completion signal 23 has not been output (No at step S426). When the return of the tool 102 to the tool replacing position has been completed at this point, according to the determination processing at step S427, the movement-command determining unit 19 determines that the tool 102 returns to the tool replacing position (Yes at step S427). According to the processing at step S428, the movement-command determining unit 19 outputs the tool replacement position return completion signal 23 to the tool-replacement-command output unit 20. The tool-replacement-command output unit 20 has already received the tool replacement command 12 according to the processing at step S306 by the program analyzing unit 18. Therefore, upon receiving the tool replacement position return completion signal 23, the tool-replacement-command output unit 20 outputs the tool replacement command 12 to the tool replacing device 9, and the tool replacing operation is started.

At this point, the axis component command for the Z axis included in the N23 block and the axis component command for the Y axis forming the N24 block are retained. Therefore, according to the determination processing at step S406, the movement-command determining unit 19 determines that the axis component command for positioning the axis related to the tool replacing operation has been retained (Yes at step S406). If the tool replacing operation has not been completed at this point, according to the determination processing at step S407, the movement-command determining unit 19 determines that the tool replacing operation has not been completed (No at step S407). According to the determination processing at step S411, the movement-command determining unit 19 determines that the axis component command for positioning the axis unrelated to the tool replacing operation has been retained (Yes at step S411). If the movement of the X axis according to the axis component command included in the N23 block has not been completed at the present point, according to the determination processing at step S412, the movement-command determining unit 19 determines that the axis unrelated to the tool replacing operation is moving (Yes at step S412).

The N25 block, which is the present processing target block, is a cutting command. Therefore, according to the determination processing at step S415, the movement-command determining unit 19 determines that the processing target block is not the post-replacement positioning command 11 (No at step S415). Because the retained axis component command is present, in the determination processing at step S429, the movement-command determining unit 19 determines that the post-replacement position determination command 11 that has not been output yet is present (No at step S429).

Subsequently, in the determination processing at step S426, the movement-command determining unit 19 determines that the tool replacement position return completion signal 23 has already been output (Yes at step S426).

At this point, the axis component command for the Z axis included in the N23 block and the axis component command for the Y axis forming the N24 block are retained. Therefore, according to the determination processing at step S406, the movement-command determining unit 19 determines that the axis component command for positioning the axis related to the tool replacing operation has been retained (Yes at step S406). If the tool replacing operation has been completed at this point, according to the determination processing at step S407, the movement-command determining unit 19 determines that the tool replacing operation has been completed (Yes at step S407). According to the determination processing at step S408, the movement-command determining unit 19 determines that the axis related to the tool replacing operation is not moving (No at step S408). According to the processing at step S409, the movement-command determining unit 19 outputs the retained axis component command for the Z axis included in the N23 block to the interpolating unit 4, and according to the processing at step S410, the movement-command determining unit 19 releases the retention of the axis component command for the Z axis included in the N23 block. According to the determination processing at step S411, the movement-command determining unit 19 determines the axis component command for positioning the axis unrelated to the tool replacing operation has been retained (Yes at step S411). If the movement of the X axis according to the axis component command included in the N23 block has not been completed at the present point, according to the determination processing at step S412, the movement-command determining unit 19 determines that the axis unrelated to the tool replacing operation is moving (Yes at step S412).

The N25 block, which is the present processing target block, is a cutting command. Therefore, according to the determination processing at step S415, the movement-command determining unit 19 determines that the processing target block is not the post-replacement positioning command 11 (No at step S415). Because the retained axis component command is present, in the determination processing at step S429, the movement-command determining unit 19 determines that the post-replacement positioning command 11 not output yet is present (No at step S429).

Subsequently, in the determination processing at step S426, the movement-command determining unit 19 determines that the tool replacement position return completion signal 23 has already been output (Yes at step S426).

At this point, only the axis component command for the Y axis forming the N24 block has been retained. Therefore, according to the determination processing at step S406, the movement-command determining unit 19 determines that the positioning command for the axis related to the tool replacing operation has not been retained (No at step S406). According to the determination processing at step S411, the movement-command determining unit 19 determines that the positioning command for the axis unrelated to the tool replacing operation has been retained (Yes at step S411). At this point, if the movement of the X axis according to the axis component command included in the N23 block has been completed, according to the determination processing at step S412, the movement-command determining unit 19 determines that the axis unrelated to the tool replacing operation is not moving (No at step S412). According to the processing at step S413, the movement-command determining unit 19 outputs the axis component command for the Y axis forming the N24 block to the interpolating unit 4, and according to the processing at step S414, the movement-command determining unit 19 releases the retention of the axis component command for the Y axis forming the N24 block.

According to the determination processing at step S415, the movement-command determining unit 19 determines that the processing target block (the N25 block) is not the post-replacement positioning command 11 (No at step S415). Because no retained axis component command is present, in the determination processing at step S429, the movement-command determining unit 19 determines that all the post-replacement positioning commands 11 have already been output (Yes at step S429). By repeating the determination processing at step S430, the movement-command determining unit 19 waits for the operation for the N23 block and the N24 block to be completed. After the operation for the N23 block and the N24 block has been completed, according to step S431, the movement-command determining unit 19 outputs the cutting command of the N25 block to the interpolating unit 4 and ends the operation.

Figures 1, 12:
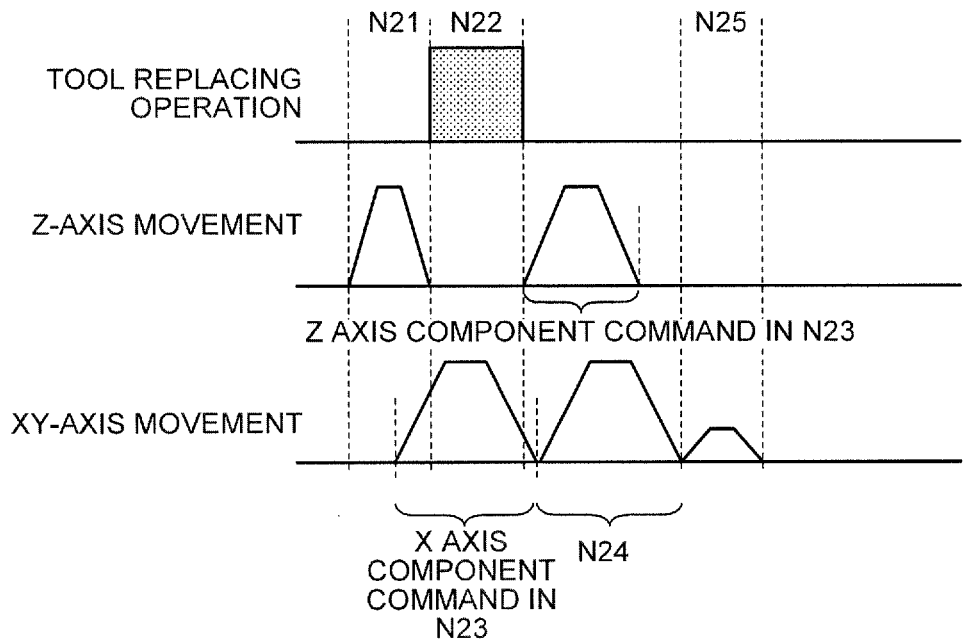
Figures 2, 12:
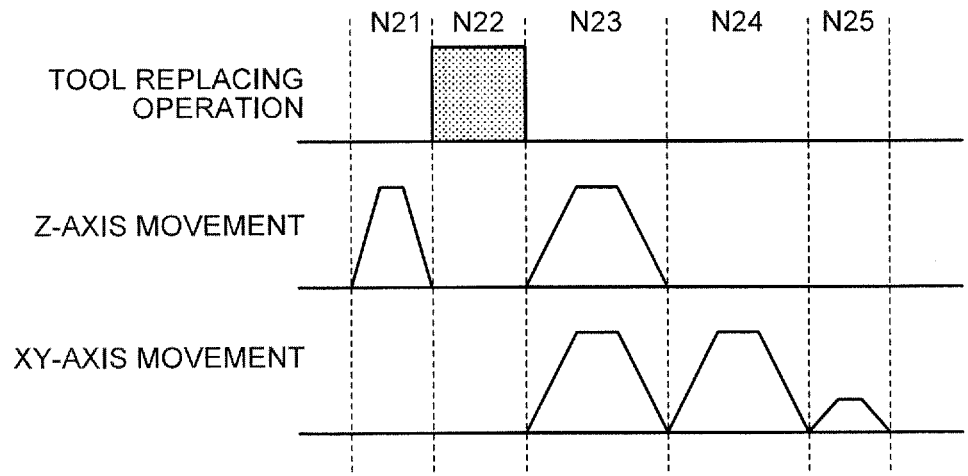

FIG. 12-1 is a timing chart for explaining operations for the axes performed when the numerical control apparatus 1a executes the machining program 7 shown in FIG. 11. In FIG. 12-2, a timing chart for explaining operations for the axes performed when the machining program 7 is sequentially executed for each of the blocks is shown as comparison of the second example. As shown in the figures, with the numerical control apparatus 1a according to the second embodiment, when the positioning operation (N23) for the X axis is started when the tool 102 reaches an interference avoidance region set in advance during the replacement position return operation (N21). The tool replacing operation (N22) is started at a point when the replacement position return operation (N21) has been completed, and the positioning operation (N23) for the Z axis is started at a point when the tool replacing operation (N22) has been completed. The positioning operation (N24) for the Y axis is started at a point when the positioning operation (N23) for the X axis has been completed. When the positioning operation (N23) for the X axis and the Y axis and the positioning operation (N24) for the Y axis are completed, the cutting operation (N25) for the X axis is started. Contrary to this, according to the comparative example, it is seen that, because the N21 block to the N25 block are sequentially executed, longer time is required than when the numerical control apparatus 1a to which the second embodiment is applied executes the machining program 7. With the numerical control apparatus 1a to which the second embodiment is applied, the start timing of the positioning operation (N23) for the X axis is set earlier than the start timing of the tool replacing operation (N22). Therefore, it is possible to further reduce a machining time compared with the first embodiment.

Note that, in the explanation in the second embodiment, the movement-command determining unit 19 outputs the axis component command for positioning the axis unrelated to the tool replacing operation at the point when the tool 102 reaches the interference avoidance region during the replacement position return operation. However, the start timing of the axis unrelated to the tool replacing operation can be set earlier than the start timing of the tool replacing operation irrespective of at which timing the axis component command is output as long as the timing is before the tool replacing operation is started after the point when the tool 102 reaches the interference avoidance region.

As explained above, according to the second embodiment, the movement-command determining unit 19 and the interpolating unit 4 are configured to execute the control for returning the axis related to the tool replacing operation to the tool replacement position and, when the post-replacement positioning command 11 output by the program analyzing unit 18 is the axis component command for positioning the axis unrelated to the tool replacing operation, start the control based on the axis component command included in the post-replacement positioning command 11 before the tool replacing operation is started after the axis related to the tool replacing operation reaches a predetermined position halfway in moving to the tool replacement position. Therefore, in the numerical control apparatus 1a, the start timing of the control for the post-replacement positioning command 11 can be set earlier compared with the first embodiment. Therefore, it is possible to further reduce the machining time.

In the first and second embodiment, the movement-command determining units 3 and 19 retain each of the axis component commands forming the post-replacement positioning command 11 and release the retention and change the output timing for each of the axis components. However, the movement-command determining units 3 and 19 can also be configured to retain each of the post-replacement positioning commands 11 and release the retention and change the output timing for each of the post-replacement positioning commands 11. In a case in which the output timing is changed for each of the post-replacement positioning commands 11, the movement-command determining units 3 and 19 are desirably configured to output, waiting for the completion of the tool replacing operation, the post-replacement positioning command 11 if the post-replacement positioning command 11 includes at least the axis component command for positioning the axis related to the tool replacing operation, and also configured to output, without waiting for the completion of the tool replacing operation, the post-replacement positioning command 11 if the post-replacement positioning command 11 is formed by only the axis component command for positioning the axis unrelated to the tool replacing operation.

Note that, in a case in which when the movement-command determining units 3 and 19 are configured to change the output timing for each of the axis component commands, if the post-replacement positioning command 11 includes the axis component command for positioning the axis related to the tool replacing operation and the axis component command for positioning the axis unrelated to the tool replacing operation, the movement-command determining units 3 and 19 can sometimes execute only the axis component command for positioning the axis unrelated to the tool replacing operation earlier. Therefore, it is possible to more effectively use the tool replacement time compared with when the movement-command determining units 3 and 19 are configured to change the output timing for each of the post-replacement positioning commands 11.

In the first and second embodiments, the movement-command determining units 3 and 19 are configured to change the output timing for each of the axis component commands. In a case in which two post-replacement positioning commands 11 are output, if the earlier post-replacement positioning command 11 of the two post-replacement positioning commands 11 does not include the axis component command for positioning the axis unrelated to the tool replacing operation, and also if the later post-replacement positioning command 11 of the two post-replacement positioning commands 11 includes the axis component command for positioning the axis unrelated to the tool replacing operation, the movement-command determining units 3 and 19 are configured to output the axis component command for positioning the axis unrelated to the tool replacing operation included in the later post-replacement positioning command 11 without waiting for the completion of the tool replacing operation, and in a case in which both of the earlier post-replacement positioning command 11 and the later post-replacement positioning command 11 include the axis component command for positioning the axis unrelated to the tool replacing operation, after the operation based on the axis component command for positioning the axis unrelated to the tool replacing operation included in the earlier post-replacement positioning command 11 has been completed, the movement-command determining units 3 and 19 are configured to output the axis component command for positioning the axis unrelated to the tool replacing operation included in the later post-replacement positioning command 11. Consequently, as shown in FIG. 7-1, the numerical control apparatuses 1 and 1a can execute control for the axis component command included in the later post-replacement positioning command 11 earlier than control for the axis component command included in the earlier post-replacement positioning command 11, and also as shown in FIG. 12-1, the numerical control apparatuses 1 and 1a can start the control for the axis component command included in the later post-replacement positioning command 11 following the control for the axis component command included in the earlier post-replacement positioning command 11 started without waiting for the completion of the tool replacing operation. Therefore, the numerical control apparatuses 1 and 1a can execute the control for the two post-replacement positioning commands 11 in as short a machining time as possible.

Note that, in the first and second embodiments, the Z axis, which is the axis for moving the tool 102, is explained as the axis related to the tool replacing operation and the X axis and the Y axis, which are the axes for moving the work, that is, the table 103, are explained as the axes unrelated to the tool replacing operation. However, a classification concerning whether an axis is the axis related to the tool replacing operation is not limited to this.

INDUSTRIAL APPLICABILITY

As explained above, the numerical control apparatus according to the present invention is suitably applied to a numerical control apparatus that numerically controls a machine tool that can execute tool replacement.

REFERENCE SIGNS LIST 1, 1a Numerical control apparatuses
2, 18 Program analyzing units
3, 19 Movement-command determining units
4 Interpolating unit
5, 20 Tool-replacement-command output units
6, 21 Parameter storing units
7 Machining program
8 Servo amplifier
9 Tool replacing device
10 Movement command
11 Post-replacement positioning command
12 Tool replacement command
13 Movement command
14 Movement amount
15 Feedback position
16 Tool replacement completion signal
17 Machine structure information
22 Tool replacement position return command
23 Tool replacement position return completion signal
24 Interference avoidance region information
100 Machine tool
101 Tool magazine
102a to c Tools
103 Table
201 Arithmetic unit
202 Storage device
203 Input device
204 Display device
205 Machine tool connection I/F
206 Numerical control program

The invention claimed is:

1. A numerical control apparatus comprising:
a memory configured to store computer-executable units;
a processor configured to execute the stored units, the units comprising:
a program analyzing unit configured to pre-fetch, from a machining program, a first command for commanding a tool replacing operation, a second command for commanding only positioning of an axis included in a machine tool, the second command following the first command, and a third command for causing a first axis related to the tool replacing operation to be moved to a tool replacement position, the third command being described before the first command, and output the first command, the second command, and the third command;
a tool-replacement-command output unit configured to cause, on the basis of the first command output by the program analyzing unit, the machine tool to execute the tool replacing operation; and
an axis control unit configured to start, when the second command output by the program analyzing unit is a command for positioning the first axis, control of the first axis based on the second command, after waiting for the completion of the tool replacement operation based on the first command, and start, when the second command output by the program analyzing unit is a command for positioning the second axis unrelated to the tool replacing operation, control of the second axis based on the second command before the tool replacing operation based on the first command is started after the first axis has reached a predetermined position halfway in movement based on the third command.

2. The numerical control apparatus according to claim 1, wherein the axis control unit starts, when the second command output by the program analyzing unit includes a command for positioning the first axis and a command for positioning the second axis, control of the first axis based on the command for positioning the first axis included in the second command, after waiting for the completion of the tool replacing operation based on the first command, and starts, control of the second axis based on the command for positioning the second axis included in the second command, without waiting for the completion of the tool replacing operation based on the first command.

3. The numerical control apparatus according to claim 2, wherein
the program analyzing unit pre-fetches a pair of the second commands from the processing program and outputs the second commands, and
the axis control unit starts, when the earlier second command of the two second commands output by the program analyzing unit does not include the command for positioning the second axis and the later second command of the two second commands includes the command for positioning the second axis, control based on the command for positioning the second axis included in the later second command, without waiting for the completion of the tool replacing operation based on the first command, and starts, when both of the earlier second command and the later second command include the command for positioning the second axis, control based on the command for positioning the second axis included in the later second command, after completing the control based on the command for positioning the second axis included in the earlier second command.

4. The numerical control apparatus according to claim 3, wherein the first axis is an axis for causing the machine tool to move a tool of the machine tool and the second axis is an axis for causing the machine tool to move work.

5. A numerical control apparatus comprising:
a memory configured to store computer-executable units; and
a processor configured to execute the stored units, the units comprising:
a program analyzing unit configured to pre-fetch, from a machining program, a first command for commanding a tool replacing operation and a second command for commanding only positioning of an axis included in a machine tool, the second command following the first command, and output the first command and the second command;
a tool-replacement-command output unit configured to cause, on the basis of the first command output by the program analyzing unit, the machine tool to execute the tool replacing operation; and
an axis control unit configured to start, when the second command output by the program analyzing unit includes a command for positioning the first axis related to the tool replacing operation and a command for positioning the second axis unrelated to the tool replacing operation, control of the first axis based on the command for positioning the first axis included in the second command, after waiting for the completion of the tool replacing operation based on the first command, and start, control of the second axis based on the command for positioning the second axis included in the second command, without waiting for the completion of the tool replacing operation based on the first command.

6. The numerical control apparatus according to claim 5, wherein the program analyzing unit pre-fetches a pair of the second commands from the processing program and outputs the second commands, and the axis control unit starts, when the earlier second command of the two second commands output by the program analyzing unit does not include the command for positioning the second axis and the later second command of the two second commands includes the command for positioning the second axis, control based on the command for positioning the second axis included in the later second command, without waiting for the completion of the tool replacing operation based on the first command, and starts, when both of the earlier second command and the later second command include the command for positioning the second axis, control based on the command for positioning the second axis included in the later second command, after completing the control based on the command for positioning the second axis included in the earlier second command.

7. The numerical control apparatus according to claim 6, wherein the first axis is an axis for causing the machine tool to move a tool of the machine tool and the second axis is an axis for causing the machine tool to move work.

\* \* \* \* \*